(12) United States Patent
Troxel et al.

(10) Patent No.: US 8,082,443 B2
(45) Date of Patent: Dec. 20, 2011

(54) PEDIGREES FOR QUANTUM CRYPTOGRAPHY

(75) Inventors: Gregory Troxel, Stow, MA (US); David Spencer Pearson, Bennington, VT (US); Brig Barnum Elliott, Arlington, MA (US)

(73) Assignee: BBNT Solutions LLC., Cambridge, MA (US)

( * ) Notice: Subject to any disclaimer, the term of this patent is extended or adjusted under 35 U.S.C. 154(b) by 1129 days.

(21) Appl. No.: 11/327,471

(22) Filed: Jan. 9, 2006

(65) Prior Publication Data
US 2007/0192598 A1 Aug. 16, 2007

(51) Int. Cl.
*H04L 9/32* (2006.01)
*H04K 1/00* (2006.01)
*H04L 9/08* (2006.01)

(52) U.S. Cl. .................. 713/168; 380/256; 380/278

(58) Field of Classification Search .............. 713/168, 713/150; 380/255, 256, 263, 278, 281, 41
See application file for complete search history.

(56) References Cited

U.S. PATENT DOCUMENTS

| | | | |
|---|---|---|---|
| 4,445,116 A | 4/1984 | Grow | |
| 4,649,233 A | 3/1987 | Bass et al. | |
| 5,243,649 A | 9/1993 | Franson | |
| 5,307,410 A * | 4/1994 | Bennett | 380/256 |
| 5,311,572 A | 5/1994 | Friedes et al. | |
| 5,339,182 A | 8/1994 | Kimble et al. | |
| 5,414,771 A | 5/1995 | Fawcett, Jr. | |
| 5,469,432 A | 11/1995 | Gat | |
| 5,502,766 A | 3/1996 | Boebert et al. | |
| 5,515,438 A | 5/1996 | Bennett et al. | |
| 5,535,195 A | 7/1996 | Lee | |
| 5,602,916 A | 2/1997 | Grube et al. | |
| 5,675,648 A | 10/1997 | Townsend | |
| 5,710,773 A | 1/1998 | Shiga | |
| 5,732,139 A | 3/1998 | Lo et al. | |
| 5,757,912 A | 5/1998 | Blow | |
| 5,764,765 A | 6/1998 | Phoenix et al. | |
| 5,764,767 A | 6/1998 | Beimel et al. | |
| 5,768,378 A | 6/1998 | Townsend et al. | |
| 5,768,391 A | 6/1998 | Ichikawa | |
| 5,805,801 A | 9/1998 | Holloway et al. | |
| 5,850,441 A | 12/1998 | Townsend et al. | |
| 5,911,018 A | 6/1999 | Bischel et al. | |
| 5,953,421 A | 9/1999 | Townsend | |

(Continued)

FOREIGN PATENT DOCUMENTS

WO WO 95/07582 3/1995

(Continued)

OTHER PUBLICATIONS

"Violations of a New Inequality for Classical Fields," J.D. Franson; The Johns Hopkins University, Applied Physics Laboratory; Feb. 1991; pp. 23-32.

(Continued)

*Primary Examiner* — Edan Orgad
*Assistant Examiner* — Jahangir Kabir
(74) *Attorney, Agent, or Firm* — Harrity & Harrity, LLP

(57) ABSTRACT

A system stores pedigrees that include details of how and when each of multiple blocks of encryption key material were distributed between two endpoints using quantum cryptographic techniques. The system receives an indication of a possible quantum cryptographic security violation and accesses the stored pedigrees to identify one or more of the multiple blocks of encryption key material that may have been compromised.

23 Claims, 12 Drawing Sheets

U.S. PATENT DOCUMENTS

| | | |
|---|---|---|
| 5,960,131 A | 9/1999 | Fouquet et al. |
| 5,960,133 A | 9/1999 | Tomlinson |
| 5,966,224 A | 10/1999 | Hughes et al. |
| 5,999,285 A | 12/1999 | Brandt et al. |
| 6,005,993 A | 12/1999 | MacDonald |
| 6,028,935 A | 2/2000 | Rarity et al. |
| 6,092,051 A | 7/2000 | Kilian et al. |
| 6,097,696 A | 8/2000 | Doverspike |
| 6,122,252 A | 9/2000 | Aimoto et al. |
| 6,128,764 A | 10/2000 | Gottesman |
| 6,130,780 A | 10/2000 | Joannopoulos et al. |
| 6,154,586 A | 11/2000 | MacDonald et al. |
| 6,160,651 A | 12/2000 | Chang et al. |
| 6,188,768 B1 | 2/2001 | Bethune et al. |
| 6,218,657 B1 | 4/2001 | Bethune et al. |
| 6,219,161 B1 | 4/2001 | Chang et al. |
| 6,226,113 B1 | 5/2001 | Wolf |
| 6,233,075 B1 | 5/2001 | Chang et al. |
| 6,233,393 B1 | 5/2001 | Yanagihara et al. |
| 6,249,009 B1 | 6/2001 | Kim et al. |
| 6,271,946 B1 | 8/2001 | Chang et al. |
| 6,272,224 B1 | 8/2001 | Mazourenko et al. |
| 6,289,104 B1 | 9/2001 | Patterson et al. |
| 6,314,189 B1 | 11/2001 | Motoyoshi et al. |
| 6,341,127 B1 | 1/2002 | Katsube et al. |
| 6,384,663 B2 | 5/2002 | Cova et al. |
| 6,424,665 B1 | 7/2002 | Kwiat et al. |
| 6,430,345 B1 | 8/2002 | Dultz et al. |
| 6,438,234 B1 | 8/2002 | Gisin et al. |
| 6,459,097 B1 | 10/2002 | Zagoskin |
| 6,463,060 B1 | 10/2002 | Sato et al. |
| 6,473,719 B1 | 10/2002 | Steenblik |
| 6,507,012 B1 | 1/2003 | Medard et al. |
| 6,519,062 B1 | 2/2003 | Yoo |
| 6,522,435 B1 | 2/2003 | Chang et al. |
| 6,522,749 B2 | 2/2003 | Wang |
| 6,525,850 B1 | 2/2003 | Chang et al. |
| 6,525,851 B2 | 2/2003 | Chang et al. |
| 6,529,498 B1 | 3/2003 | Cheng |
| 6,529,601 B1 | 3/2003 | Townsend |
| 6,538,990 B1 | 3/2003 | Prorock |
| 6,539,410 B1 | 3/2003 | Klass |
| 6,560,707 B2 | 5/2003 | Curtis et al. |
| 6,563,310 B2 | 5/2003 | Zagoskin |
| 6,563,311 B2 | 5/2003 | Zagoskin |
| 6,563,796 B1 | 5/2003 | Saito |
| 6,580,537 B1 | 6/2003 | Chang et al. |
| 6,601,169 B2 | 7/2003 | Wallace, Jr. et al. |
| 6,601,170 B1 | 7/2003 | Wallace, Jr. |
| 6,631,151 B1 | 10/2003 | Berger |
| 6,654,346 B1 | 11/2003 | Mahalingaiah et al. |
| 6,657,757 B1 | 12/2003 | Chang et al. |
| 6,674,558 B1 | 1/2004 | Chang et al. |
| 6,678,379 B1 | 1/2004 | Mayers et al. |
| 6,678,450 B1 | 1/2004 | Franson |
| 6,683,291 B2 | 1/2004 | Barchers |
| 6,684,335 B1 | 1/2004 | Epstein, III et al. |
| 6,720,588 B2 | 4/2004 | Vickers |
| 6,720,589 B1 | 4/2004 | Shields |
| 6,728,281 B1 | 4/2004 | Santori et al. |
| 6,754,214 B1 | 6/2004 | Mahalingaiah |
| 6,836,463 B2 | 12/2004 | Garcia-Luna-Aceves et al. |
| 7,246,240 B2 * | 7/2007 | Chuang et al. ............ 713/176 |
| 7,460,670 B1 * | 12/2008 | Elliott ........................ 380/256 |
| 7,512,242 B2 * | 3/2009 | Pearson et al. ............ 380/281 |
| 2003/0231771 A1 | 12/2003 | Gisin et al. |
| 2004/0184615 A1 * | 9/2004 | Elliott et al. ............... 380/283 |
| 2005/0190921 A1 * | 9/2005 | Schlafer et al. ............ 380/278 |

FOREIGN PATENT DOCUMENTS

| | | |
|---|---|---|
| WO | WO 95/07583 | 3/1995 |
| WO | WO 95/07585 | 3/1995 |

OTHER PUBLICATIONS

"Quantum Cryptography Defies Eavesdropping," Graham Collins, *Physics Today*, Nov. 1992, pp. 21-23.

"Single Photon Interference in 10 km Long Optical Fibre Interferometer," P. D. Townsend et al., *Electronics Letters*, vol. 29, No. 7; Apr. 1, 1993, pp. 834-835.

"Enhanced Single Photon Fringe Visibility in a 10 km-Long Prototype Quantum Cryptography Channel," P. D. Townsend et al., *Electronics Letters*, vol. 29, No. 14; Jul. 8, 1993; pp. 1291-1293.

"Secure Key Distribution System Based on Quantum Cryptography," P. D. Townsend et al., *Electronics Letters*, vol. 30, No. 10; May 12, 1994, pp. 809-811.

"Multi-User Quantum Cryptography on Optical Networks," Simon J.D. Phoenix et al., *Journal of Modern Optics*, vol. 42, No. 6, Jun. 1995, pp. 1155-1163.

"Intrinsic-Stabilization Uni-Directional Quantum Key Distribution Between Beijing and Tianjin," Xiao-fan Mo et al., Department of Electronic Engineering and Information Science at the University of Science and Technology of China, Dec. 3, 2004, pp. 1-7.

"Quantum Public Key Distribution System"; IBM Technical Disclosure Bulletin; vol. 28, No. 7; Dec. 7, 1985; pp. 3153-3163.

"Quantum key distribution: Real-time compensation of interferometer phase drift," NTNU Department of Physical Electronics, Feb. 2002, pp. 1-45.

Brig B. Elliott et al.: Path-Length control in a interferometric QKD link, 11 pages, Mar. 24, 2003.

Bennett et al.; Experimental Quantum Crytopgraphy; Sep. 1991; pp. 1-28.

Slutsky et al.; Defense frontier analysis of quantum cryptographic systems; Applied Optics; vol. 37, No. 14; May 10, 1998; pp. 2869-2878.

Co-pending U.S. Appl. No. 10/271,103, filed Oct. 15, 2002, entitled "Systems and Methods for Framing Quantum Cryptographic Links," Oleksiy Pikalo et al., 39 page specification, 15 sheets of drawings.

Co-pending U.S. Appl. No. 10/716,078, filed Nov. 18, 2003, entitled "Systems and Methods for Implementing Path Length Control for Quantum Cryptographic Systems," Oleksiy Pikalo et al 87 pages.

Co-pending U.S. Appl. No. 10/716,747, filed Nov. 18, 2003, entitled "Systems and Methods for Implementing Training Frames for Quantum Cryptographic Links," Milton Alexander Colvin et al.; 71 pages.

Co-pending U.S. Appl. No. 10/271,150, filed Oct. 15, 2002, entitled "Quantum Cryptographic System With Photon Counting Detector," Brig Barnum Elliott et al.; 40 pages.

Co-pending U.S. Appl. No. 10/289,192, filed Nov. 6, 2002, entitled "Systems and Methods for Implementing a Unified Framework for Quantum Cryptographic Protocols," David Spencer Pearson et al.; 54 pages.

Co-pending U.S. Appl. No. 10/325,325, filed Dec. 18, 2002, entitled "Systems and Methods for Implementing Adaptive Quantum Cryptography", Brig B. Elliott et al., 37 pages of specification, 8 sheets of drawings.

Co-pending U.S. Appl. No. 10/797,140, filed Mar. 11, 2004, entitled "Systems and Methods for Implementing Adaptive Training for Quantum Cryptography", Brig B. Elliott et al., 49 page specification, 29 sheets of drawings.

"Multi-Protocol Lambda Switching: Combining MPLS Traffic Engineering Control With Optical Crossconnects," Awduche et al., Internet Engineering Task Force, Internet-Draft, Jan. 2001, 21 pages.

"Multi-Protocol Lambda Switching: Issues in Combining MPLS Traffic Engineering Control With Optical Cross-Connects," Basak et al., Internet-Draft, Aug. 2000, 9 pages.

"Generalized Privacy Amplification," Bennett et al., May 31, 1995, 24 pages.

"Quantum Cryptography: Public Key Distribution and Coin Tossing," Bennett et al., International Conference on Computers, Systems and Signaling, Dec. 10-12, 1984, 5 pages.

"An Autocompensating Fiber-Optic Quantum Cryptography System Based on Polarization Splitting of Light," Bethune et al., IEEE Journal of Quantum Electronics, Feb. 9, 2001, pp. 100-108.

"Prototype Autocompensating Quantum Cryptography System Based on Polarization Splitting of Light," Bethune et al., Meeting of the American Physical Society, Mar. 1999.

"Cryptology col.- 25 Years of Quantum Cryptography," Brassard et al., SIGACT News, Jul. 31, 1996, pp. 13-24.

"Secret-Key Reconciliation by Public Discussion," Brassard et al., 1994, 14 pages.

"Multiparty Key Distribution and Secret Sharing Based on Entanglement Swapping," Cabello, Sep. 7, 2000, 8 pages.

"Secure Multi-Party Quantum Computation," Crepeau et al., Copyright 2001 ACM, 10 pages.

"Lucent Technologies Names Cherry Murray Physical Sciences Research Vice President," Eisenburg et al., www.lucent.com/press/0300/000328.bla.html, Mar. 28, 2000, 3 pages.

"Quantum Cryptography Based on Bell's Theorem," Ekert, Aug. 5, 1991, Physical Review Letters, vol. 67, No. 6, pp. 661-663.

"Building the Quantum Network," Chip Elliott, BBN Technologies, New Journal of Physics 4, Jan. 7, 2002, 10 pages.

"Bell Inequality for Position and Time," J.D. Franson, Physical Review Letters, vol. 62, No. 19, May 8, 1989, pp. 2205-2208.

"Quantum Cryptography and Long Distance Bell Experiments: How to Control Decoherence," N. Gisin et al., Jan. 15, 1999, 12 pages.

"Quantum Cryptography," Gisin et al., Reviews of Modern Physics, vol. 74, Jan. 2002, pp. 145-193.

"Secure Quantum Key Distribution Using Squeezed States," Gottesman et al., Sep. 25, 2000, 19 pages.

"Quantum Cryptography with Entangled Photons," Jennewein et al., Physical Review Letters, vol. 84, No. 20, May 15, 2000, pp. 4729-4732.

"Free-Space Micromachined Optical Switches for Optical Networking," Lin et al., IEEE Journal of Selected Topics in Quantum Electronics, vol. 5, No. 1, Jan./Feb. 1999, pp. 4-9.

"Information-Theoretic Key Agreement: From Weak to Strong Secrecy for Free," Maurer et al., 2000, 20 pages.

"Secret Key Agreement by Public Discussion From Common Information," Maurer et al., IEEE Transactions of Information Theory, vol. 39, pp. 733-742, 1993.

"Entangled State Quantum Cryptography: Eavesdropping on the Ekert Protocol," Naik et al., Physical Review Letters, vol. 84, No. 20, May 15, 2000, pp. 4733-4736.

"Long Distance Entanglement-Based Quantum Key Distribution," Ribordy et al., Physical Review A. vol. 63, Aug. 7, 2000, 12 pages.

"Multiprotocol Label Switching Architecture," Rosen et al., The Internet Society, Jan. 2001, 61 pages.

"Quantum Cryptography Protocols Robust Against Photon Number Splitting Attacks," Scarani et al., 2003, 2 pages.

"Quantum Cryptography Protocols Robust Against Photon Number Splitting Attacks for Weak Laser Pulse Implementations," Scarani et al., Physical Review Letters, vol. 92, No. 5, Feb. 6, 2004, 4 pages.

"Applied Cryptography Second Edition, Protocol, Algorithms, and Source Code in C," Schneier, Oct. 17, 1995, 6 pages.

"Quantum Key Distribution Over 67 km with a Plug and Play System," Stucki et al., New Journal of Physics 4, Mar. 7, 2002, 8 pages.

"PPLN Waveguide for Quantum Communication," Tanzilli et al., The European Physical Journal D, 18, Jul. 13, 2001, pp. 155-160.

"Long-Distance Bell-Type Tests Using Energy-Time Entangled Photons," Tittel et al., Physical Review A, vol. 59, No. 6, Jun. 1999, pp. 4150-4163.

"Telecommunications Applications of MEMS," Walker, MSTNEWS, Mar. 2000, 4 pages.

"Efficient Multi-Party Quantum Secret Sharing Schemes," Xiao et al., May 28, 2004, 7 pages.

"Small Forwarding Tables for Fast Routing Lookups," Degermark et al., ACM 1997, 12 pages.

"Security Issues in Policy Routing," Estrin et al., IEEE 1989, pp. 183-193.

"Distributed, Scalable Routing Based on Vectors of Link States," Garcia-Luna-Aceves et al., IEEE Journal on Selected Areas in Communication, vol. 13, No. 8, Oct. 1995, pp. 1383-1395.

"Scalable Link-State Internet Routing," Garcia-Luna-Aceves et al., 1998, 10 pages.

"High-Speed Policy-based Packet Forwarding Using Efficient Multi-Dimensional Range Matching," Lakshman et al., ACM 1998, pp. 203-214.

"IP Lookups Using Multiway and Multicolumn Search," Lampson et al., IEEE/ACM Transactions on Networking, vol. 7, No. 3, Jun. 1999, pp. 324-334.

"Hierarchically-organized, multihop mobile wireless networks for quality-of-service support," Ramanathan et al., Mobile Networks and Applications 3, 1998, pp. 101-119.

"An Adaptive Hierarchical Routing Protocol," Tsai et al., IEEE Transactions on Computer, vol. 38, No. 8, Aug. 1989, pp. 1059-1075.

"Scalable High Speed IP Routing Lookups," Waldvogel et al., ACM 1997, pp. 25-36.

"Differential-phase-shift Quantum Key Distribution," Honjo et al., NTT Technical Review, vol. 2, No. 12, Dec. 2004, pp. 26-33.

"Recent Progress in Quantum Key Transmission," Tomita et al., NEC Journal of Advanced Technology, vol. 2, No. 1, Nov. 2004, pp. 84-91.

P.D. Townsend et al.: "Quantum Cryptography for Multi-User Passive Optical Networks," Electronics Letters, vol. 30, pp. 1875-1877, 1994.

Gui Lu Long: "Some Quantum Cryptography Protocols and the Nature of Liquid NMR Quantum Computation," Hong Kong, Nov. 22, 2003.

Deng Fu-Guo et al.: "A Theoretical Scheme for Multi-User Quantum Key Distribution with N Einstein-Podolsky-Rosen Pairs on a Passive Optical Network," Abstract, Chinese Phys. Lett. 19 (Jul. 2002) 893-896.

Milan L. Masanovic et al.: "Design and Performance of a Monolithically Integrated Widely Tunable All-Optical Wavelength Converter With Independent Phase Control," IEEE Photonics Technology Letters, vol. 16, No. 10, Oct. 2004, pp. 2299-2301.

Yoshihiro Nambu et al.: "Planar Lightwave Circuits for Quantum Cryptographic Systems," Jul. 10, 2003, 10 pages.

Mario Paniccia et al.: "Intel Unveils Silicon Breakthrough: High-Speed Silicon Modulation," Intel Corporation, Feb. 2004, pp. 1-6.

Mike Salib et al.: "Silicon Photonics," Intel Technology Journal, vol. 8, Issue 2 May 10, 2004, pp. 143-160.

John E. Bowers: "Optical Network and Component Trends" Intel Corporation, 2004, 51 pages.

Mario Paniccia: "Silicon Integrated Photonics," Intel Corporation, Feb. 2, 2005, pp. 1-30.

Yoshihiro Nambu et al.: "BB84 Quantum Key Distribution System Based on Silica-Based Planar Lightwave Circuits," Fundamental and Environmental Research Laboratories, Apr. 2, 2004, 11 pages.

Haisheng Rong et al.: "A Continuous-Wave Raman Silicon Laser," Nature, Feb. 17, 2005, vol. 433, pp. 725-728.

Co-pending U.S. Appl. No. 09/943,709, filed Aug. 31, 2001 entitled "Systems and Methods for Path Set-Up in a Quantum Key Distribution Network," Brig B. Elliott, 34 pages.

Co-pending U.S. Appl. No. 10/985,631, filed Nov. 10, 2004 entitled "Systems and Methods for Framing Quantum Cryptographic Links," John D. Schlafer 31 pages.

"A High-Speed Silicon Optical Modulator Based on a Metal-Oxide-Semiconductor," Ansheng Liu et al, Nature, vol. 427, Feb. 12, 2004, pp. 615-618.

* cited by examiner

| KEY PEDIGREE 1000 | PRODUCING ENDPOINT 910 | PEER ENDPOINT 915 | PUBLIC CHANNEL AUTH 1005 | PUBLIC CHANNEL KEY ID 1010 | KEY ID 1015 | DIGITAL SIGNATURE 950 |

PEDIGREES FOR QUANTUM CRYPTOGRAPHY

GOVERNMENT CONTRACT

The U.S. Government has a paid-up license in this invention and the right in limited circumstances to require the patent owner to license others on reasonable terms as provided for by the terms of Contract No. F30602-01-C-0170, awarded by the Defense Advanced Research Project Agency (DARPA).

FIELD OF THE INVENTION

The present invention relates generally to cryptographic systems and, more particularly, to quantum cryptographic systems.

BACKGROUND OF THE INVENTION

Within the field of cryptography, it is well recognized that the strength of any cryptographic system depends on, among other things, the key distribution technique employed. For conventional encryption to be effective, such as a symmetric key system, two communicating parties must share the same key and that key must be protected from access by others. The key must, therefore, be distributed to each of the parties. FIG. 1 shows one form of a conventional key distribution process. As shown in FIG. 1, for a party, Bob, to decrypt ciphertext encrypted by a party, Alice or a third party must share a copy of the key with Bob. This distribution process can be implemented in a number of conventional ways including the following: 1) Alice can select a key and physically deliver the key to Bob; 2) a third party can select a key and physically deliver the key to Bob; 3) if Alice and Bob both have an encrypted connection to a third party, the third party can deliver a key on the encrypted links to Alice and Bob; 4) if Alice and Bob have previously used an old key, Alice can transmit a new key to Bob by encrypting the new key with the old; and 5) Alice and Bob may agree on a shared key via a one-way mathematical algorithm, such as Diffie-Hellman key agreement. All of these distribution methods are vulnerable to Eve breaking a cryptographic primitive, such as Diffie-Hellman or a symmetric cipher. Eve can eavesdrop and intercept or copy a distributed key and then subsequently decrypt any intercepted ciphertext that is sent between Bob and Alice. In conventional cryptographic systems, this eavesdropping may go undetected, with the result being that any ciphertext sent between Bob and Alice is compromised.

To combat these inherent deficiencies in the key distribution process, researchers have developed a key distribution technique called quantum cryptography. Quantum cryptography employs quantum systems and applicable fundamental principles of physics to ensure the security of distributed keys. Heisenberg's uncertainty principle mandates that any attempt to observe the state of a quantum system will necessarily induce a change in the state of the quantum system. Thus, when very low levels of matter or energy, such as individual photons, are used to distribute keys, the techniques of quantum cryptography permit the key distributor and receiver to determine whether any eavesdropping has occurred during the key distribution. Quantum cryptography, therefore, prevents an eavesdropper, like Eve, from copying or intercepting a key that has been distributed from Alice to Bob without a significant probability of Bob's or Alice's discovery of the eavesdropping.

A well known quantum key distribution scheme involves a quantum channel, through which Alice and Bob send keys using polarized or phase encoded photons, and a public channel, through which Alice and Bob send ordinary messages. Since these polarized or phase encoded photons are employed for quantum key distribution (QKD), they are often termed QKD photons. The quantum channel is a transmission medium that isolates the QKD photons from interaction with the environment. The public channel may include a channel on any type of communication network such as a Public Switched Telephone Network, the Internet, or a wireless network. An eavesdropper, Eve, may attempt to measure the photons on the quantum channel. Such eavesdropping, however, will induce a measurable disturbance in the photons in accordance with the Heisenberg uncertainty principle. Alice and Bob use the public channel to discuss and compare the photons sent through the quantum channel. If, through their discussion and comparison, they determine that there is no evidence of eavesdropping, then the key material distributed via the quantum channel can be considered completely secret.

FIG. 2 illustrates a well-known scheme 200 for quantum key distribution in which the polarization of each photon is used for encoding cryptographic values. To begin the quantum key distribution process, Alice generates random bit values and bases 205 and then encodes the bits as polarization states (e.g., 0°, 45°, 90°, 135°) in sequences of photons sent via the quantum channel 210 (see row 1 of FIG. 3). Alice does not tell anyone the polarization of the photons she has transmitted. Bob receives the photons and measures their polarization along either a rectilinear or diagonal basis with randomly selected and substantially equal probability. Bob records his chosen basis (see row 2 of FIG. 3) and his measurement results (see row 3 of FIG. 3). Bob and Alice discuss 215, via the public channel 220, which basis he has chosen to measure each photon. Bob, however, does not inform Alice of the result of his measurements. Alice tells Bob, via the public channel, whether he has made the measurement along the correct basis (see row 4 of FIG. 3). In a process called "sifting" 225, both Alice and Bob then discard all cases in which Bob has made the measurement along the wrong basis and keep only the ones in which Bob has made the measurement along the correct basis (see row 5 of FIG. 3).

Alice and Bob then estimate 230 whether Eve has eavesdropped upon the key distribution. To do this, Alice and Bob must agree upon a maximum tolerable error rate. Errors can occur due to the intrinsic noise of the quantum channel and eavesdropping attack by a third party. Alice and Bob choose randomly a subset of photons m from the sequence of photons that have been transmitted and measured on the same basis. For each of the m photons, Bob announces publicly his measurement result. Alice informs Bob whether his result is the same as what she had originally sent. They both then compute the error rate of the m photons and, since the measurement results of the m photons have been discussed publicly, the polarization data of the m photons are discarded. If the computed error rate is higher than the agreed upon tolerable error rate (typically no more than about 15%), Alice and Bob infer that substantial eavesdropping has occurred. They then discard the current polarization data and start over with a new sequence of photons. If the error rate is acceptably small, Alice and Bob adopt the remaining polarizations, or some algebraic combination of their values, as secret bits of a shared secret key 235, interpreting horizontal or 45 degree polarized photons as binary 0's and vertical or 135 degree photons as binary 1's (see row 6 of FIG. 3). Conventional error detection and correction processes, such as parity checking or convolutional encoding, may further be performed on the secret bits to correct any bit errors due to the intrinsic noise of the quantum channel.

Alice and Bob may also implement an additional privacy amplification process 240 that reduces the key to a small set of derived bits to reduce Eve's knowledge of the key. If, subsequent to discussion 215 and sifting 225, Alice and Bob adopt n bits as secret bits, the n bits can be compressed using, for example, a hash function. Alice and Bob agree upon a publicly chosen hash function $f$ and take K=$f$(n bits) as the shared r-bit length key K. The hash function randomly redistributes the n bits such that a small change in bits produces a large change in the hash value. Thus, even if Eve determines a number of bits of the transmitted key through eavesdropping, and also knows the hash function $f$, she still will be left with very little knowledge regarding the content of the hashed r-bit key K. Alice and Bob may further authenticate the public channel transmissions to prevent a "man-in-the-middle" attack in which Eve masquerades as either Bob or Alice.

SUMMARY OF THE INVENTION

In accordance with the purpose of the invention as embodied and broadly described herein, a method may include communicating a sequence of symbols using quantum cryptographic mechanisms between two nodes to derive a block of encryption key material. The method may further include constructing a pedigree that includes details of how and when the block of encryption key material was produced using the quantum cryptographic mechanisms.

Consistent with a further aspect of the invention, a method may include communicating symbols using quantum cryptographic mechanisms between a first endpoint and a second endpoint and publicly discussing the symbols between the first endpoint and the second endpoint to obtain a block of encryption key material. The method may further include noting parameters associated with the quantum cryptographic symbol transmission and/or the public discussion and storing the noted parameters as a pedigree for the block of encryption key material.

Consistent with another aspect of invention, a method may include storing pedigrees that include details of how and when each of multiple blocks of encryption key material were distributed between two endpoints using quantum cryptographic techniques. The method may further include receiving an indication of a possible quantum cryptographic security violation and accessing the stored pedigrees to identify one or more of the plurality of blocks of encryption key material that may have been compromised.

Consistent with yet another aspect of the invention, a method may include storing pedigrees that include details of how and when each of multiple blocks of encryption key material were produced using quantum cryptographic techniques. The method may further include using the stored pedigrees to ascertain the extent and/or nature of a possible security violation.

BRIEF DESCRIPTION OF THE DRAWINGS

The accompanying drawings, which are incorporated in and constitute a part of this specification, illustrate one or more exemplary embodiments of the invention and, together with the description, explain the invention. In the drawings.

FIG. 10 illustrates an exemplary key pedigree consistent with another aspect of the invention;

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims.

Systems and methods consistent with principles of the invention construct and store quantum cryptographic key pedigrees that may include relevant details of how and when blocks of key material were produced using quantum cryptographic key distribution techniques. The stored key pedigrees may subsequently used to ascertain the extent and/or nature of a possible security violation that may have occurred in association with the quantum key distribution process.

Exemplary Network

Figure 1:
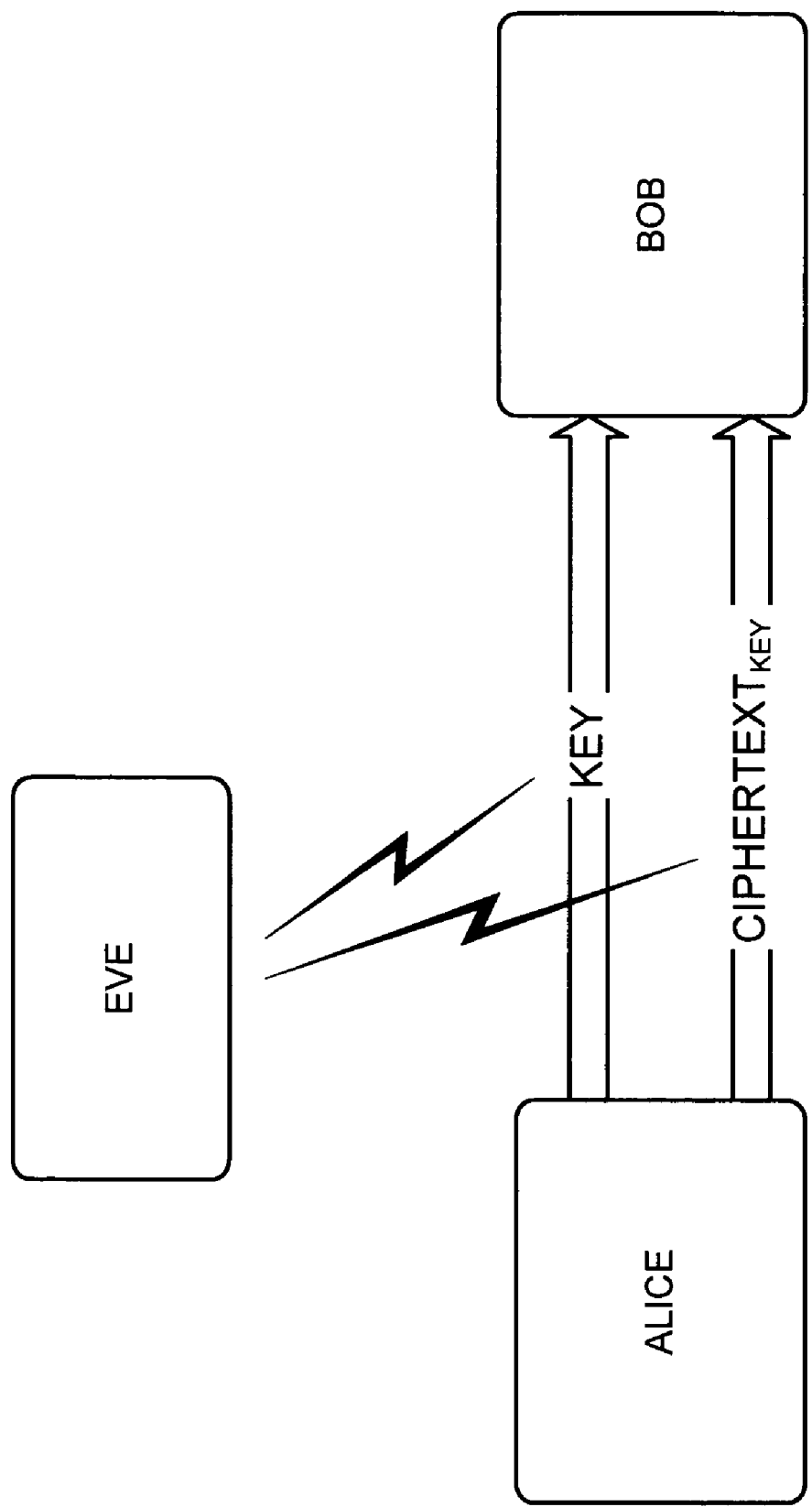
FIG. 1 illustrates existing cryptographic key distribution and ciphertext communication.
Figure 2:
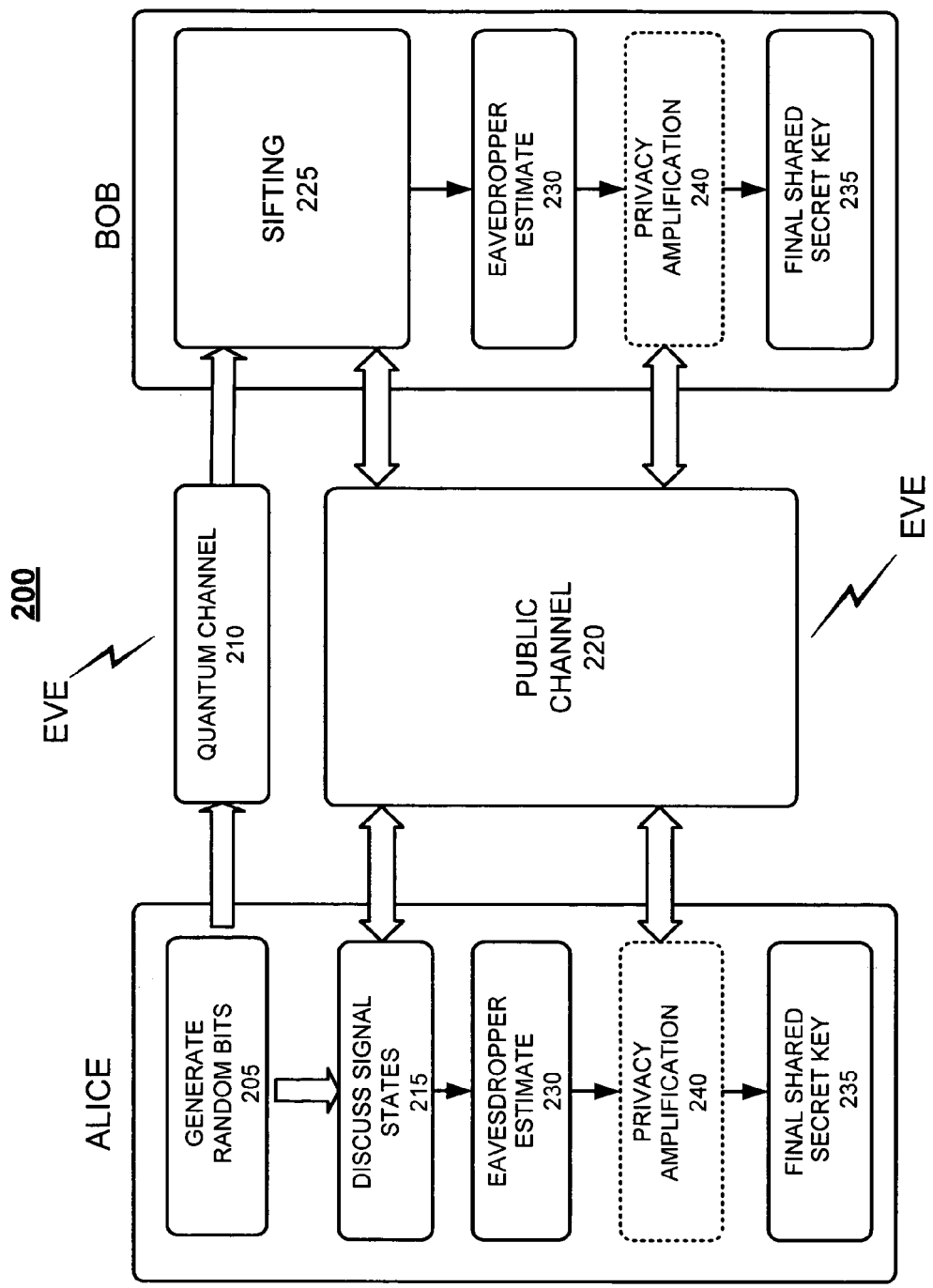
FIG. 2 illustrates an existing quantum cryptographic key distribution (QKD) process.
Figure 3:
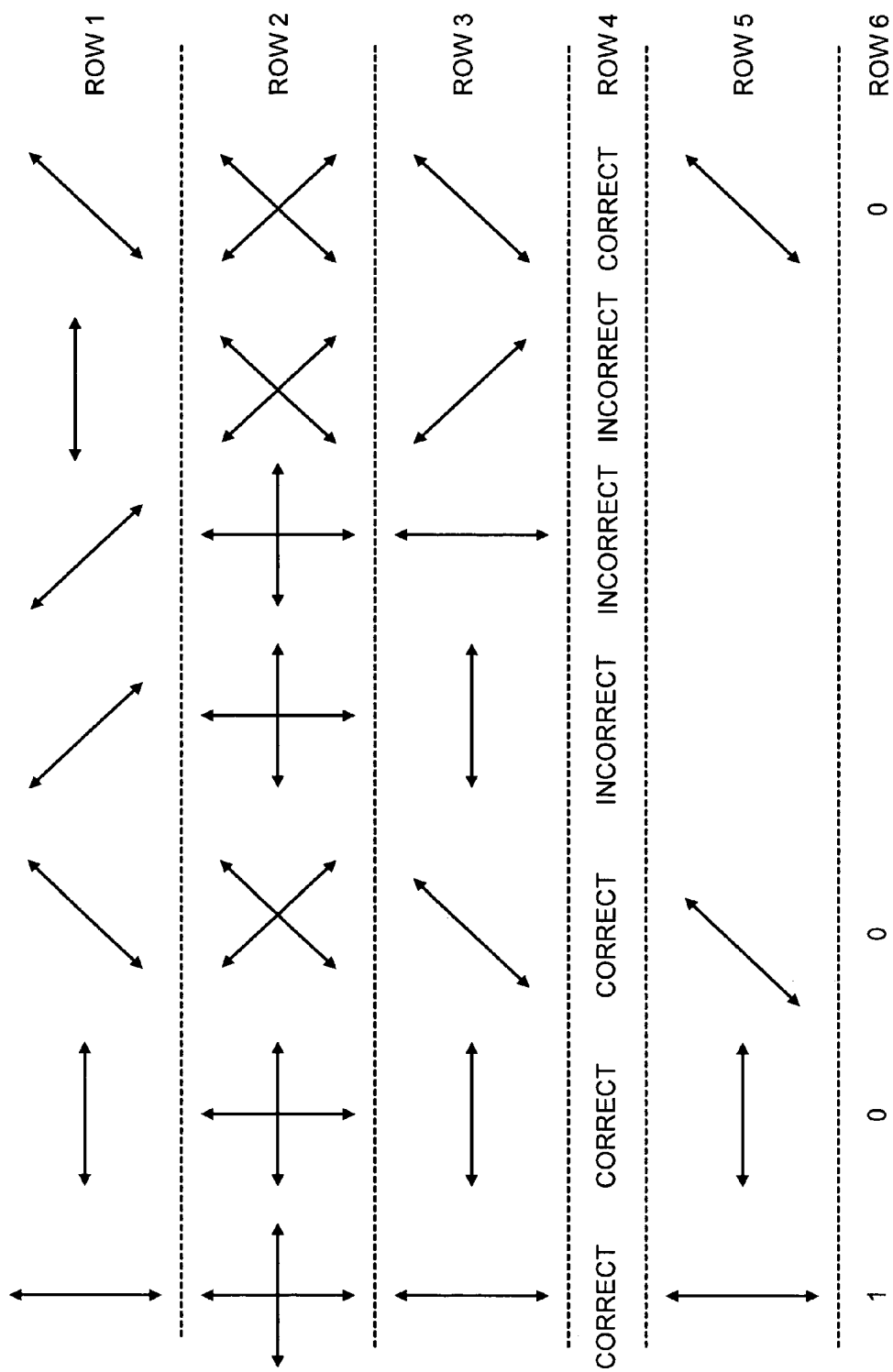
FIG. 3 illustrates an existing quantum cryptographic sifting and error correction process.
Figure 4:
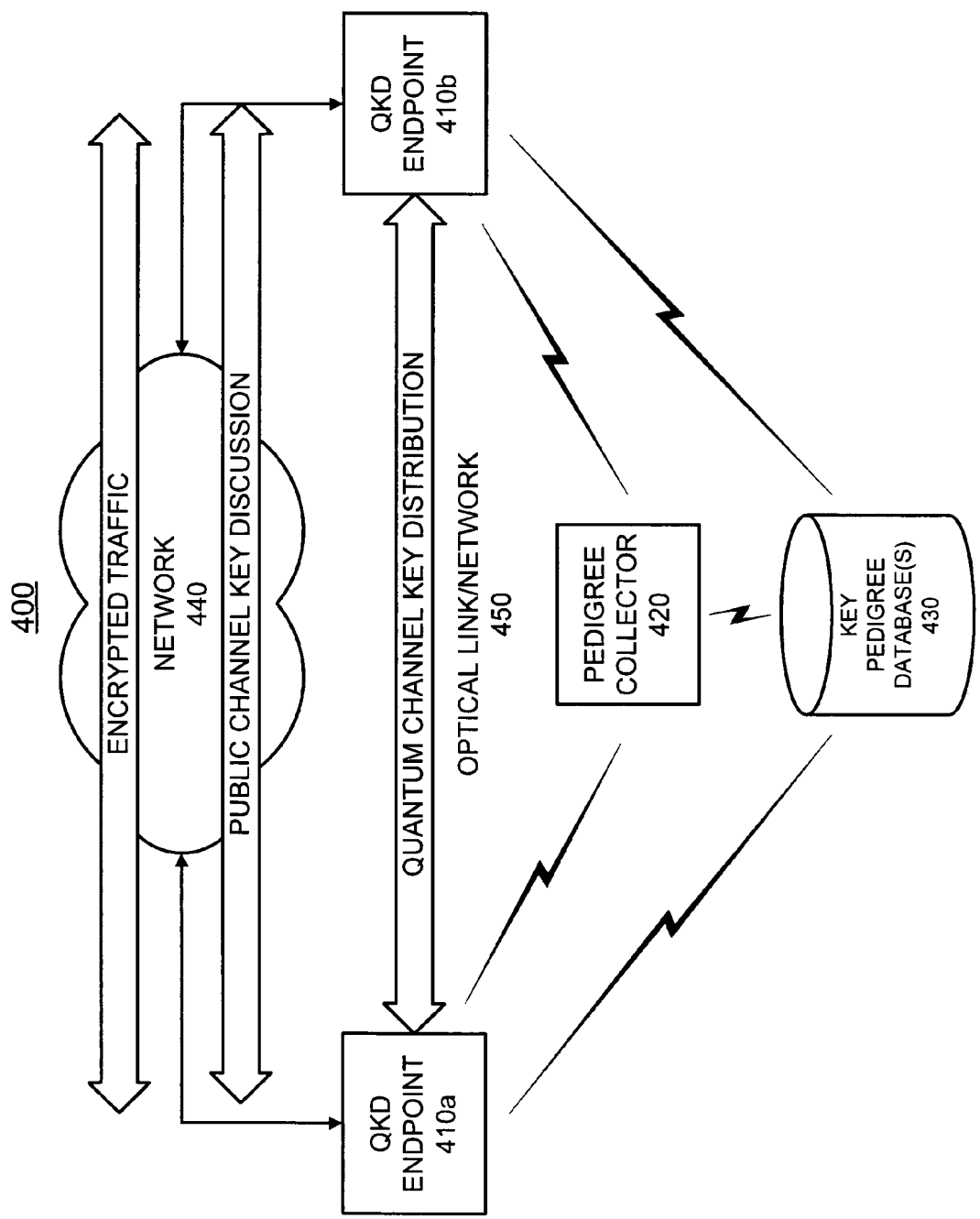
FIG. 4 illustrates an exemplary network in which systems and methods, consistent with principles of invention, may be implemented.

FIG. 4 illustrates an exemplary network 400 in which systems and methods, consistent with principles of the invention, can be implemented that distribute encryption keys via quantum cryptographic mechanisms. Network 400 may include QKD endpoints 410a and 410b, an optional pedigree collector 420 and one or more key pedigree databases 430. QKD endpoints 410a and 410b may be connected via a network 440 and an optical link/network 450. Two QKD endpoints 410a and 410b have been shown for illustrative purposes only. Multiple QKD endpoints 410 (i.e., greater than two) may connect to one another via network 440 and optical link/network 450. Key pedigree database(s) 430 may connect to QKD endpoint 410a and/or QKD endpoint 410b via network 440, or via other wired, wireless or optical connection links. In some implementations, pedigree collector 420 may connect to QKD endpoint 410a and/or 410b, and to key pedigree database(s) 430, via network 440, or via other wired, wireless or optical connection links.

Network 440 may include one or more networks of any type, including a Public Land Mobile Network (PLMN), Public Switched Telephone Network (PSTN), LAN, metropolitan area network (MAN), wide area network (WAN), Internet, or Intranet. Network 440 may also include a dedicated fiber link or a dedicated freespace optical or radio link. The one or more PLMNs may further include packet-switched sub-networks, such as, for example, General Packet Radio Service (GPRS), Cellular Digital Packet Data (CDPD), and Mobile IP sub-networks.

Optical link/network 450 may include a link that may carry light throughout the electromagnetic spectrum, including light in the human visible spectrum and light beyond the human-visible spectrum, such as, for example, infrared or ultraviolet light. The link may include, for example, a conventional optical fiber. Alternatively, the link may include a free-space optical path, such as, for example, a path through the atmosphere or outer space, or even through water or other transparent media. As another alternative, the link may include a hollow optical fiber that may be lined with photonic band-gap material.

Furthermore, optical link/network 450 may include a QKD network that includes one or more QKD switches (not shown) for distributing encryption keys between a source QKD endpoint (e.g., QKD endpoint 410a) and a destination QKD endpoint (e.g., QKD endpoint 410b). Such a QKD network may include the QKD network described in U.S. patent application Ser. No. 09/943,709, entitled "Systems and Methods for Path Set-up in a Quantum Key Distribution Network," and U.S. patent application Ser. No. 09/944,328, entitled "Quantum Cryptographic Key Distribution Networks with Untrusted Switches," the entire disclosures of which are expressly incorporated by reference herein.

QKD endpoints 410a and 410b may distribute quantum cryptographic keys via a "quantum channel" of optical link/network 450. Subsequent to quantum key distribution via the quantum channel of optical link/network 450, QKD endpoint 410a and QKD endpoint 410b may discuss distributed key material using a "public channel" of network 440 to agree on encryption key material that is to be used for encrypting traffic between QKD endpoints 410a and 410b. QKD endpoint 410a and QKD endpoint 410b may subsequently encrypt traffic between one another using the agreed upon encryption key material and transmit the traffic via network 440. One or both of QKD endpoints 410a and 410b may store relevant details regarding how and when the agreed upon encryption key material was distributed in key pedigree database(s) 430, or may transmit the relevant details to pedigree collector 420 which, in turn, may store the relevant details in key pedigree database(s) 430. The information stored in key pedigree database(s) 430 may be used to ascertain the extent and nature of a security violation. Pedigree collector 420 may serve as a "collecting station" for collecting pedigrees from QKD endpoints 410 and storing those pedigrees in key pedigree database(s) 430. Key pedigree database(s) 430 may be stored locally at each QKD endpoint 410, or may be stored remotely.

It will be appreciated that the number of components illustrated in FIG. 4 is provided for explanatory purposes only. A typical network may include more or fewer components than are illustrated in FIG. 4. For example, key pedigree database(s) 430 may include multiple distributed databases.

EXEMPLARY QKD ENDPOINT

Figure 5:
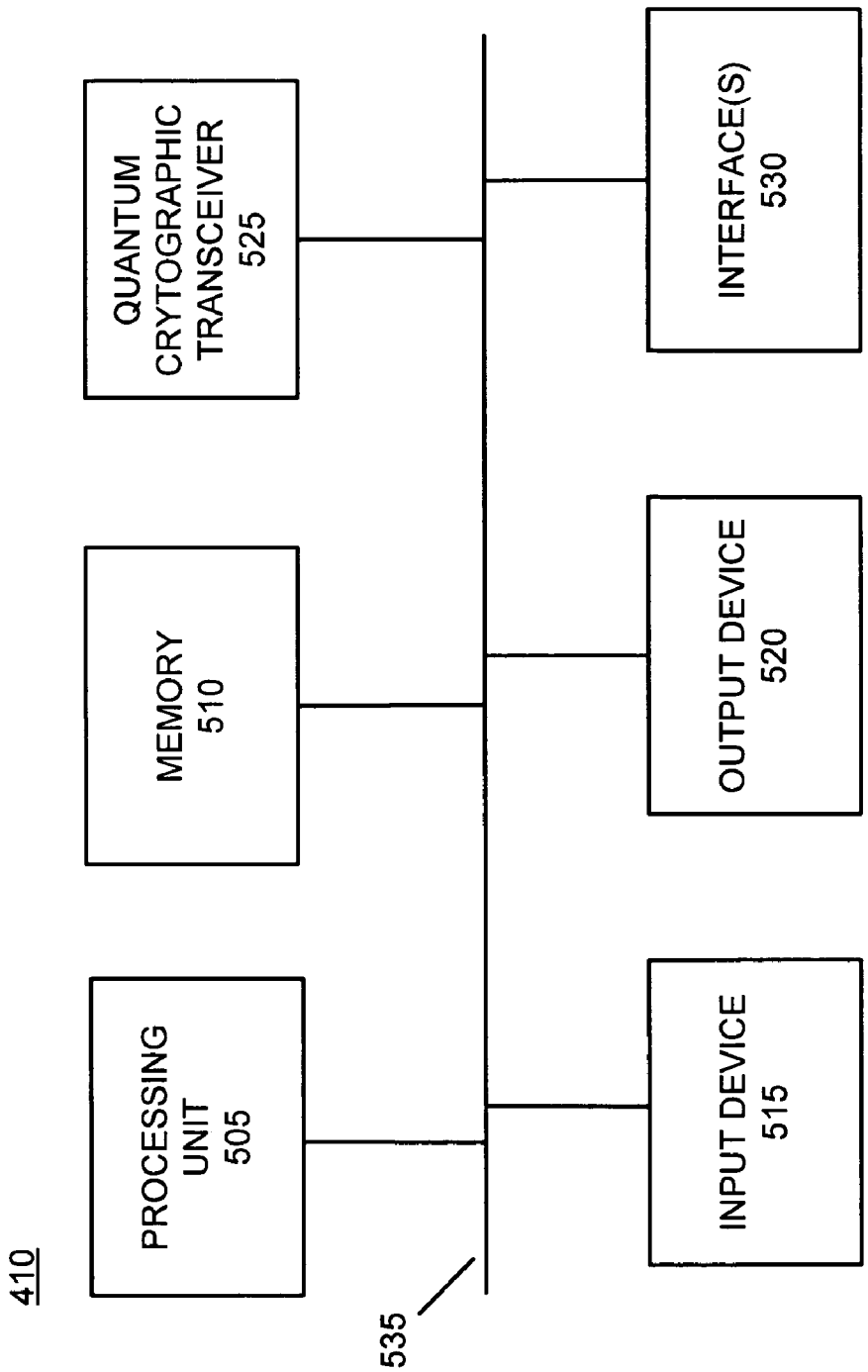
FIG. 5 illustrates an exemplary configuration of a QKD endpoint of FIG. 4 consistent with the present invention.

FIG. 5 illustrates exemplary components of a QKD endpoint 410 consistent with the present invention. QKD endpoint 410 may include a processing unit 505, a memory 510, an input device 515, an output device 520, a quantum cryptographic transceiver 525, an interface(s) 530 and a bus 535.

Processing unit 505 may perform all data processing functions for inputting, outputting, and processing of QKD endpoint data. Memory 510 may include Random Access Memory (RAM) that provides temporary working storage of data and instructions for use by processing unit 505 in performing processing functions. Memory 510 may additionally include Read Only Memory (ROM) that provides permanent or semi-permanent storage of data and instructions for use by processing unit 505. Memory 510 can also include large-capacity storage devices, such as a magnetic and/or optical recording medium and its corresponding drive.

Input device 515 permits entry of data into QKD endpoint 410 and may include a user interface (not shown). Output device 520 permits the output of data in video, audio, and/or hard copy format. Quantum cryptographic transceiver 525 may include mechanisms for transmitting and receiving encryption keys using quantum cryptographic techniques. In some implementations, quantum cryptographic transceiver 525 may include the transceiver components described in U.S. application Ser. No. 10/985,631; entitled "Systems and Methods for Framing Quantum Cryptographic Links" and filed on Nov. 10, 2004, the disclosure of which is incorporated by reference herein in its entirety. Interface(s) 530 may interconnect QKD endpoint 410 with link/network 450. Bus 535 interconnects the various components of QKD endpoint 410 to permit the components to communicate with one another.

Exemplary Quantum Cryptographic Transceiver

Figure 6:
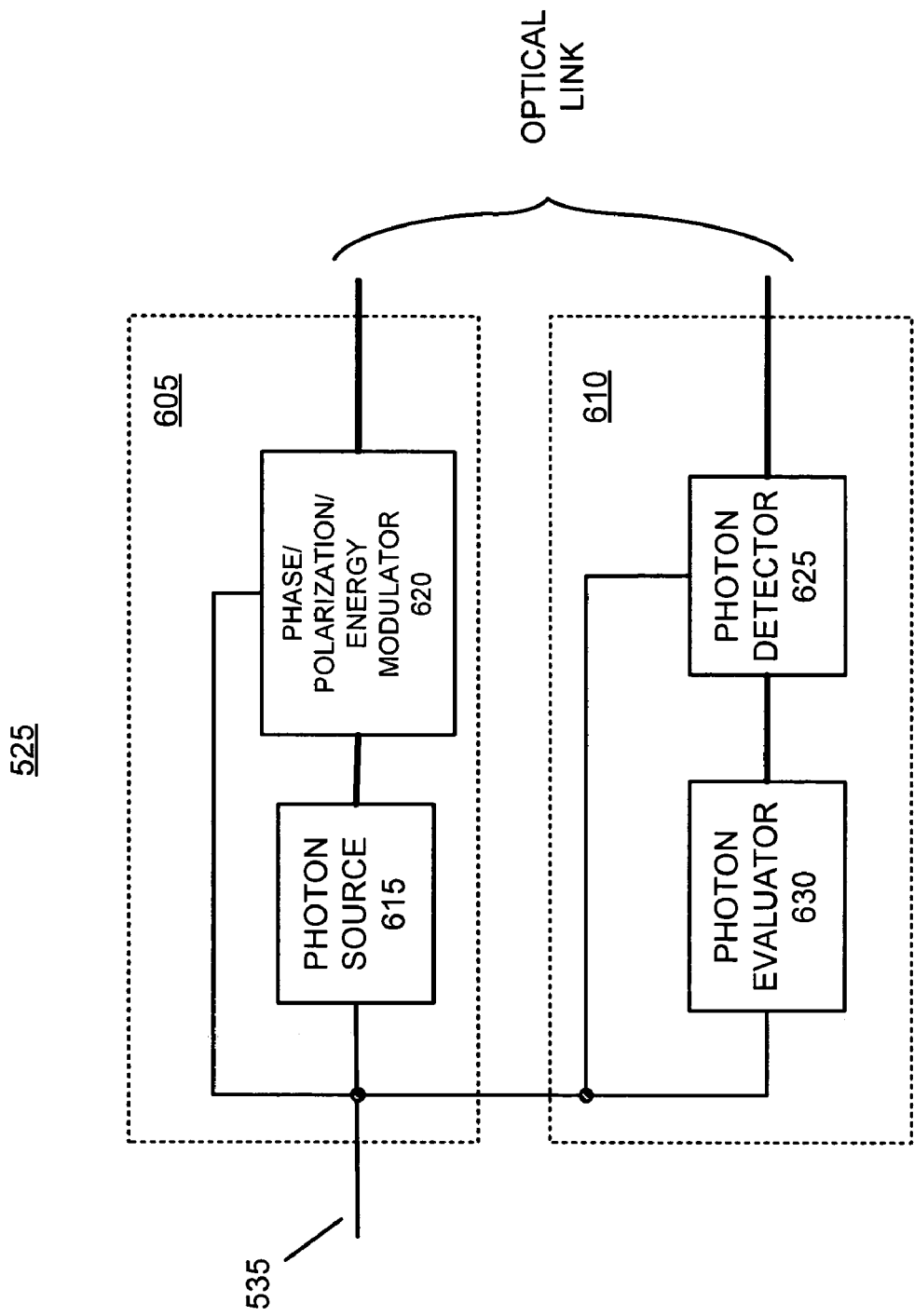
FIG. 6 illustrates exemplary components of the quantum cryptographic transceiver of FIG. 5 consistent with principles of the invention.

FIG. 6 illustrates exemplary components of quantum cryptographic transceiver 525 of a QKD endpoint 410 consistent with the present invention. Quantum cryptographic transceiver 525 may include a QKD transmitter 605 and a QKD receiver 610. QKD transmitter 605 may include a photon source 615 and a phase/polarization/energy modulator 620. Photon source 615 can include, for example, a conventional laser. Photon source 615 may produce photons according to instructions provided by processing unit 505. Photon source 615 may produce photons of light with wavelengths throughout the electromagnetic spectrum, including light in the human visible spectrum and light beyond the human-visible spectrum, such as, for example, infrared or ultraviolet light. Phase/polarization/energy modulator 620 can include, for example, Mach-Zehnder interferometers. Phase/polarization/energy modulator 620 may encode outgoing photons from the photon source according to commands received from processing unit 505 for transmission across an optical link, such as link 450. In addition, "decoy states" may be performed by modulator 620, e.g., by selectively varying the attenuation and, thus, the resultant mean photon number.

QKD receiver 610 may include a photon detector 625 and a photon evaluator 630. Photon detector 625 can include, for example, conventional avalanche photo detectors (APDs) or conventional photo-multiplier tubes (PMTs). Photon detector 625 can also include cryogenically cooled detectors that sense energy via changes in detector temperature or electrical resistivity as photons strike the detector apparatus. Photon detector 625 can detect photons received across the optical link. Photon evaluator 630 can include conventional circuitry for processing and evaluating output signals from photon detector 625 in accordance with quantum cryptographic techniques.

Exemplary QKD Endpoint Functional Block Diagram

Figure 7:
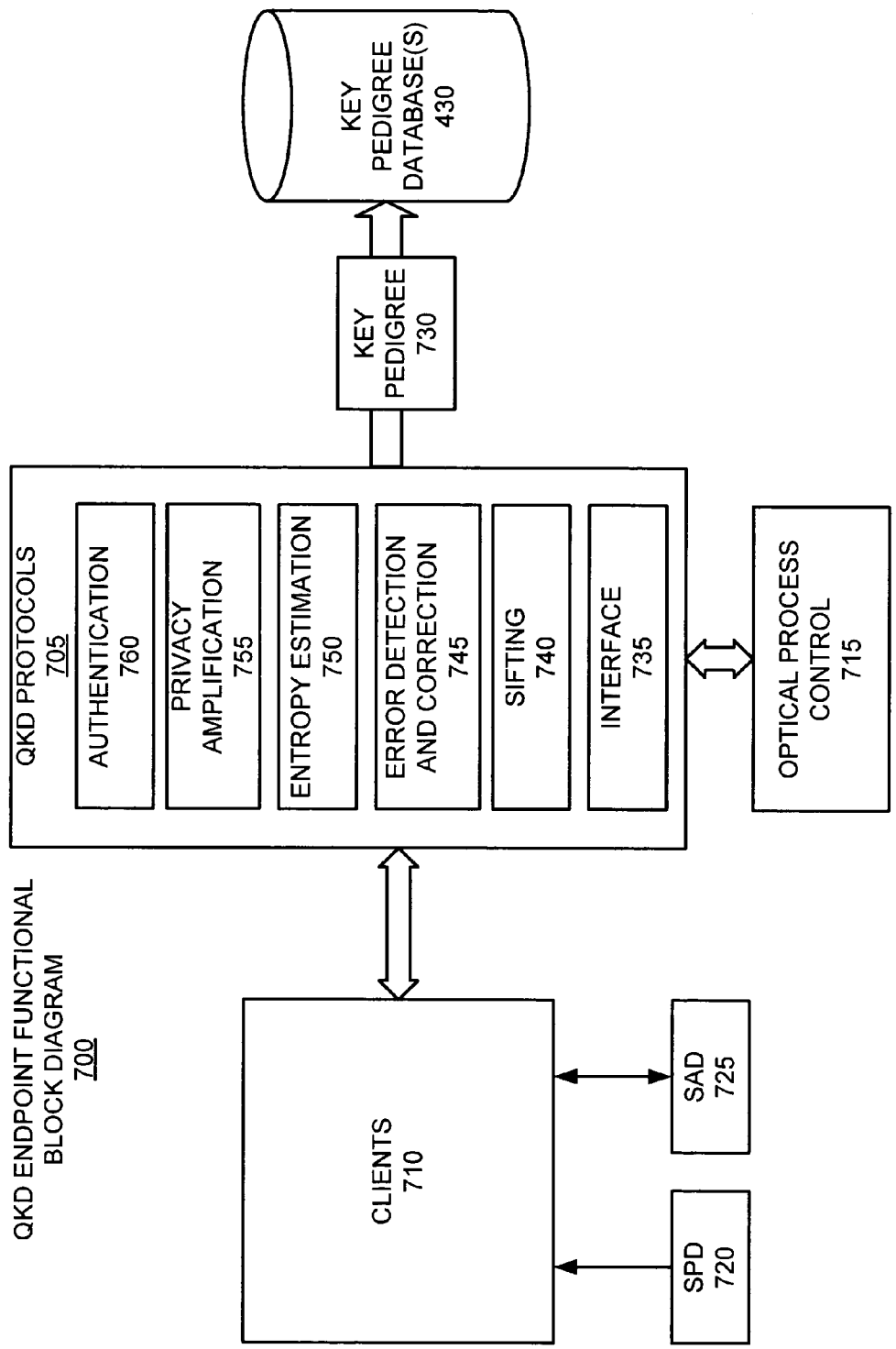
FIG. 7 illustrates an exemplary functional block diagram of a QKD endpoint of FIG. 4 consistent with principles of the invention.

FIG. 7 illustrates an exemplary functional block diagram 700 of a QKD endpoint 410 consistent with the present invention. Functional block diagram 700 may include QKD protocols 705, client(s) 710, optical process control 715, a security policy database (SPD) 720, a security association database (SAD) 725, a key pedigree 730 and one or more key pedigree databases 450. QKD protocols 705 may further include an interface layer 730, a sifting layer 740, an error detection and correction layer 745, an entropy estimation layer 750, a privacy amplification layer 755 and an authentication layer 760.

The interface layer 735 may include protocols for deriving QKD symbols from photons transmitted via QKD link/network 450 and received at a quantum cryptographic transceiver 525 of a QKD endpoint 410. Values of the QKD symbols (e.g., high or low symbol values) may be interpreted at interface layer 735 by the polarization, phase or energy states of incoming photons. Interface layer 735 may measure the polarization, phase or energy state of each received photon and interpret the measurement as corresponding to whether a first detector fired, a second detector fired, both first and second detectors fired, neither detectors fired, or any other relevant measurements such as the number of photons detected.

Sifting layer 740 may implement protocols for discarding or "sifting" certain of the raw symbols produced by layer interface 735. Sifting layer 740 may implement traditional sifting, "Geneva sifting," or other types of QKD sifting protocols. The protocols of sifting layer 740 may exchange basis information between the parties to a QKD symbol exchange. As an example, when QKD endpoint 410b receives polarized photons from QKD endpoint 410a, sifting layer 740 may measure the polarization of each photon along either a rectilinear or diagonal basis with equal probability. Sifting layer 740 may record the basis that is used for measuring the polarization of each photon. Sifting layer 740 may inform QKD endpoint 410b of the basis chosen for measuring the polarization of each photon. QKD endpoint 410b may then, via the protocols of sifting layer 740, inform QKD endpoint 410a, whether it has made the polarization measurement along the correct basis. QKD endpoint 410a and 410b may then "sift" or discard all polarization measurements in which QKD endpoint 410a has made the measurement along the wrong basis and keep only the measurements in which QKD endpoint 410a has made the measurement along the correct basis. For example, if QKD endpoint 410b transmits a photon with a symbol encoded as a 0° polarization and if QKD endpoint 410a measures the received photon via a diagonal basis (45°-135°), then QKD endpoint 410b and 410a will discard this symbol value since QKD endpoint 410a has made the measurement along the incorrect basis.

Error detection and correction layer 745 may implement protocols for correcting errors that may be induced in transmitted photons due to, for example, the intrinsic noise of the quantum channel. Layer 745 may implement parity or cascade checking, low density parity checks, convolutional encoding or other error correction processes. Entropy estimation layer 750 may implement protocols for determining whether eavesdropping has occurred on the quantum channel. Entropy estimation layer 750 may implement such estimates as 'BBSSS 92,' Slutsky, Shor-Preskill, Myers/Pearson, or other entropy estimates. Errors in the states (e.g., polarization, phase or energy) of received photons may occur if an eavesdropper is eavesdropping on the quantum channel. To determine whether eavesdropping has occurred during transmission of a sequence of photons, QKD endpoint 410a and QKD endpoint 410b may randomly choose a subset of photons from the sequence of photons that have been transmitted and measured on the same basis. For each of the photons of the chosen subset, QKD endpoint 410b publicly announces its measurement result to QKD endpoint 410a. QKD endpoint 410a then informs QKD endpoint 410b whether its result is the same as what was originally sent. QKD endpoint 410a and 410b both may then compute the error rate of the subset of photons. If the computed error rate is higher than an agreed upon tolerable error rate (typically about 15%), then QKD endpoint 410a and 410b may infer that substantial eavesdropping has occurred. They may then discard the current polarization data and start over with a new sequence of photons.

Privacy amplification layer 755 may implement protocols for reducing error-corrected symbols received from layer 750 to a small set of derived symbols (e.g., bits) to reduce an eavsdropper's knowledge of the key. Privacy amplification layer 755 may implement any type of privacy amplification protocol including, for example, 'GF2" Universal Hash'. If, subsequent to sifting and error correction, QKD endpoint 410a and 410b have adopted n symbols as secret symbols, then privacy amplification layer 755 may compress the n symbols using, for example, a hash function. QKD endpoint 410a and 410b may agree upon a publicly chosen hash function $f$ and take K=$f$(n symbols) as the shared r-symbol length key K. The hash function randomly redistributes the n symbols such that a small change in symbols produces a large change in the hash value. Thus, even if an eavesdropper determines a number of symbols of the transmitted key through eavesdropping, and also knows the hash function $f$ they still will be left with very little knowledge regarding the content of the hashed r-symbol key K.

Authentication layer 760 may implement protocols for authenticating transmissions between QKD endpoint 410a and 410b via link/network 450. Such protocols may include any conventional authentication mechanisms known to one skilled in the art, such as, for example IPsec based public key or secret key authentication protocols. A key pedigree 730 may then be associated with a sequence of cryptographic key symbols that results from QKD protocols 705. Key pedigree 730 may include parameters associated with the transmission of the cryptographic key symbols using the quantum channel or with discussion using the public channel. Key pedigree 730 may be stored in key pedigree database(s) 430. Other parameters associated with classic key agreement (e.g., from clients 710) may be included in key pedigree 730. For example, parameters associated with classic key agreement, such as classic key agreement primitives, may be included in key pedigree 730 (e.g., classical session key, etc.).

Client(s) 710 may include one or more clients that perform various QKD endpoint functions. In one implementation, client(s) 710 may include an Internet Key Exchange (IKE) client that implements key exchange protocols and algorithms. In another implementation, client(s) 710 may perform classic cryptographic techniques (e.g., Diffie-Hellman) for obtaining and using encryption keys, in addition to QKD. Optical process control 715 may control opto-electronics of quantum cryptographic transceiver 525. In exemplary embodiments that use framing, optical process control 715 may impose the framing on the QKD link. Optical process control 715 may continuously transmit and receive frames of QKD symbols and report the results to QKD protocol suite 705.

SPD 720 may include a database, together with algorithms, that classify data units received via network 440 to determine which data units belong in which security associations. This may be accomplished by matching various fields in the received data units with rule sets in the database. SAD 725 may include a database, together with algorithms, that perform Internet Protocol Security (IPsec) on data units as needed for a given security association (e.g., encryption, decryption, authentication, encapsulation).

Exemplary Quantum Cryptographic

Key Transmission Process

Figure 8:
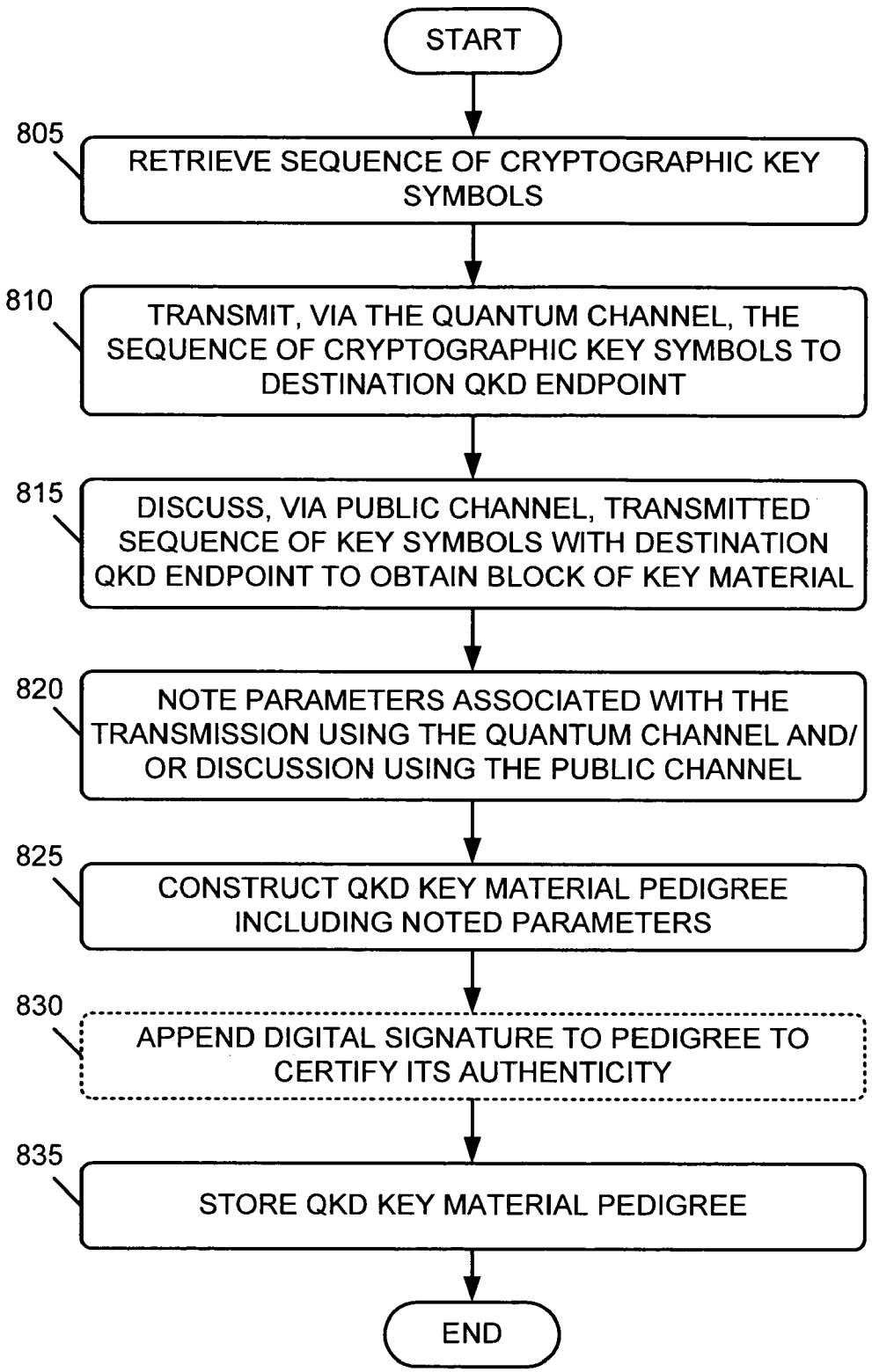
FIG. 8 is a flow chart that illustrates an exemplary quantum cryptographic key transmission process consistent with principles of the invention.

FIG. 8 is a flowchart that illustrates an exemplary process, consistent with principles of the invention, for transmitting encryption key material using quantum cryptographic mechanisms and constructing a key pedigree based on the transmitted key material. As one skilled in the art will appreciate, the method exemplified by FIG. 8 can be implemented as a sequence of instructions and stored in memory 510 of a QKD endpoint 410 for execution by processing unit 505.

The exemplary process may begin with the retrieval of a sequence of cryptographic key symbols (block 805). The key symbols may be produced using any existing technique for deriving encryption keys that can be used in any existing type of encryption/decryption technique. The key symbols may be stored in memory 510 for subsequent retrieval. The sequence of cryptographic key symbols may be transmitted, via the quantum channel, to a destination QKD endpoint using quantum cryptographic mechanisms (block 810). The sequence of cryptographic key symbols may be transmitted via a quantum cryptographic transceiver 525 of a QKD endpoint 410 by modulating the phase, polarization and/or energy of photons.

The transmitted sequence of key symbols may then be discussed, via the public channel, with the destination QKD endpoint to obtain a block of key material (e.g., a group of key symbols) (block 815). The public discussion may use "sifting" techniques of sifting layer 740 for obtaining a block of key material that includes a subset of the transmitted sequence of cryptographic key symbols.

Parameters associated with the transmission using the quantum channel and/or the discussion using the public channel may be noted (block 820). Many different parameters associated with the key transmission using the quantum channel or the discussion using the public channel may be noted. Such parameters may include, but are not limited to, the following:

1) whether the underlying optical system used for quantum cryptographic key transmission is based on an attenuated laser pulse, a true single photon source, or pairs of entangled photons;
2) for attenuated laser pulses, the mean photon number (e.g., 0.1 photons per laser pulse) and an indication of the decoy state if decoy states are being employed;
3) the error bounds that the error detection and correction protocol is designed to achieve;
4) the amount of privacy amplification applied;
5) an identification of the QKD endpoints that participated in the quantum cryptographic key transmission and reception;
6) the unique identifiers for all sequences (e.g., frames) of quantum cryptographic key symbols that went into a block of key material;
7) the times at which the block of key material were derived, including the starting and ending times for quantum channel communication and the starting and ending times of public channel discussion (i.e., in coordinated universal time);
8) the maximum observed quantum bit error rate (QBER), and average observed bit error rate, during the intervals over which the block of key material was derived;
9) the estimated entropy rate for the block of key material at the time it was produced (before privacy amplification);
10) the times at which the QKD protocols that derived the block of key material were operated (e.g., starting and ending times in coordinated universal time);
11) an identification of one or more of the QKD protocols used to derive the block of key material (e.g., an identification of the sifting protocol, the entropy estimation protocol, the privacy amplification protocol, etc.);
12) information related to authentication of the public channel used in discussing the key symbols transmitted using quantum cryptographic mechanisms. Such information may include, for example, an identification of the kind of authentication used on the public channel (e.g., public key authentication with RSA signatures, secret key authentication with keys derived from quantum cryptography, hybrid public/secret key authentication employing both RSA signatures and keys derived using quantum cryptography, etc.) and may additionally include a unique identifier for the actual key material used in the public channel authentication;
13) a size of the block of key material;
14) parameters of a security guarantee associated with the block of key material;
15) a random number(s) used in deriving the block of key material;
16) statistical information regarding raw detections associated with the sequence of cryptographic key symbols (revealing, for example, if one symbol is significantly more prevalent);
17) identifiers of other keys used to construct the block of key material (e.g., if key relay is used); and/or
18) summary information (e.g., statistical data) about any decoy states and, for each decoy state, the reception rate and the error rate.

The parameters listed above represent a few illustrative examples of the types of parameters associated with the key transmission using the quantum channel and/or the discussion using the public channel. Other parameters not described herein may be noted and used in a key pedigree consistent with principles of the invention. Parameters associated with classical cryptographic techniques may also be noted. For example, classic key agreement primitives used for encrypting symbols between QKD endpoints 410*a* and 410*b* may be noted for inclusion in the key pedigree.

Figure 9:
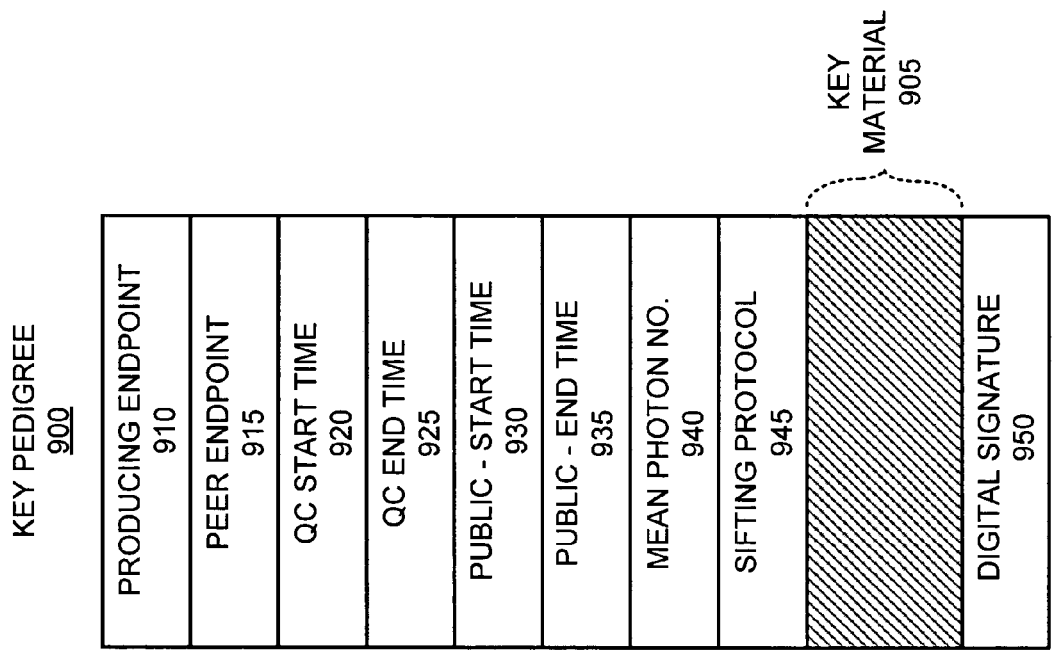
FIG. 9 illustrates an exemplary key pedigree consistent with one aspect of the invention.

A QKD key material pedigree may be constructed, that includes the noted parameters, for the block of key material (block 825). The key pedigree may include relevant details of how and when the associated block of key material was produced. FIG. 9 illustrates an exemplary key pedigree 900 consistent with one aspect of the invention. Key pedigree 900 may, optionally, include a block of key material 905, a producing endpoint identifier 910, a peer endpoint identifier 915, a quantum cryptographic (QC) start time 920, a quantum cryptographic (QC) end time 925, a public discussion start time 930, a public discussion end time 935, a mean photon number 940, a sifting protocol identifier 945 and a digital signature 950. A key identifier (e.g., as described below with respect to FIG. 10) may additionally be included in key pedigree 900. Block of key material 905 may be included in key pedigree 900, for example, in an implementation when block of key material 905 is stored locally at a QKD endpoint 410.

The block of key material 905 may include symbols, derived using QKD (block 810) and public discussion (block 815), that can be used as an encryption key, or part of an encryption key. Alternatively, block of key material 905 may include only high-level representations of the symbols contained in the block of key material, such as, for example, block number identifiers, checksums, hashed digests, etc. Producing endpoint identifier 910 may uniquely identify the QKD endpoint 410 that produced and transmitted the block of key material. Peer endpoint identifier 915 may uniquely identify the QKD endpoint 410 that is the intended destination of the block of key material transmitted from the QKD endpoint 410 identified by the producing endpoint identifier 910. Quantum cryptographic start time 920 may indicate a time at which the quantum key distribution between the endpoints identified by identifiers 910 and 915 was initiated. Quantum cryptographic end time 925 may indicate a time at which the quantum key distribution between the endpoints identified by identifiers 910 and 915 was completed. Public discussion start time 930 may indicate a time at which the public discussion phase of the quantum key distribution process was initiated. Public discussion end time 935 may indicate a time at which the public discussion phase of the quantum key distribution phase was completed. Mean photon number 940 may indicate a mean number of photons per photon pulse used by the QKD endpoint 410 identified by producing endpoint identifier 910 to transmit key symbols. Sifting protocol identifier 945 may identify the quantum cryptographic sifting protocol used during the public discussion phase of the quantum key distribution. Digital signature 950 may include a type of data that certifies the authenticity of pedigree 900. Digital signature 950 may be produced using any type of existing authentication technique. If decoy states are employed, they may also be identified here (not shown). An indication of eavesdropping (e.g., observed error rate, average observed error rate) (not shown), associated with QKD of the block of key material, may also be included in key pedigree 900.

FIG. 10 illustrates an exemplary key pedigree 1000 consistent with another aspect of the invention. Key pedigree 1000 may include a producing endpoint identifier 910, a peer endpoint identifier 915, a public channel authentication identifier 1005, a public channel key identifier 1010, a unique key identifier 1015 and a digital signature 950. Public channel authentication identifier 1005 may identify the authentication used on the public channel during the public discussion phase of the quantum cryptography key distribution. Any type of authentication may be used, such as, for example, public key authentication with RSA signatures, secret key authentication with keys derived from quantum cryptography, hybrid public/secret key authentication employing with RSA signatures and keys derived from quantum cryptography. Public channel key identifier 1010 may uniquely identify the key material used in this authentication.

Key identifier 1015 may uniquely identify each block of the key material that results from the QKD process. In many cases, it may be undesirable to store actual key material itself in a centralized database since compromise of the database would expose all of the key material. Hence, instead of storing the key material itself, a "tag" or "unique identifier" may be stored in place of the key material. Exposure of the unique identifier would not be harmful since it does not allow recovery of any information encrypted with the associated key material. Key identifier 1015 may be created in any number of ways. In one embodiment, multiple items may be concatenated together to create the unique identifier: the identifier for the QKD endpoint that produced the key material, the identifier for the peer QKD endpoint in the QKD process, a timestamp for when the key material was finished being distributed, and/or an identifier of the particular sequence of symbols that went into the key material. Other ways of creating key identifier 1015 may alternatively be used. If decoy states are employed, they may also be identified here (not shown). An indication of eavesdropping (e.g., observed error rate, average observed error rate) (not shown), associated with QKD of the block of key material, may also be included in key pedigree 1000. Key pedigrees 900 and 1000 may correspond to key pedigree 730 depicted in FIG. 7.

A digital signature 950 may be appended to the pedigree to certify the pedigree's authenticity (optional block 830). The digital signature may be produced using any type of existing authentication technique. The QKD key material pedigree may then be stored (block 835). The transmitting QKD endpoint (e.g., endpoint 410a) may store the pedigree in key pedigree database 430 if it is connected to database(s) 430, or the transmitting QKD endpoint may communicate the pedigree to pedigree collector 420 which, in turn, may store the pedigree in key pedigree database 430.

Exemplary Quantum Cryptographic

Key Reception Process

Figure 11:
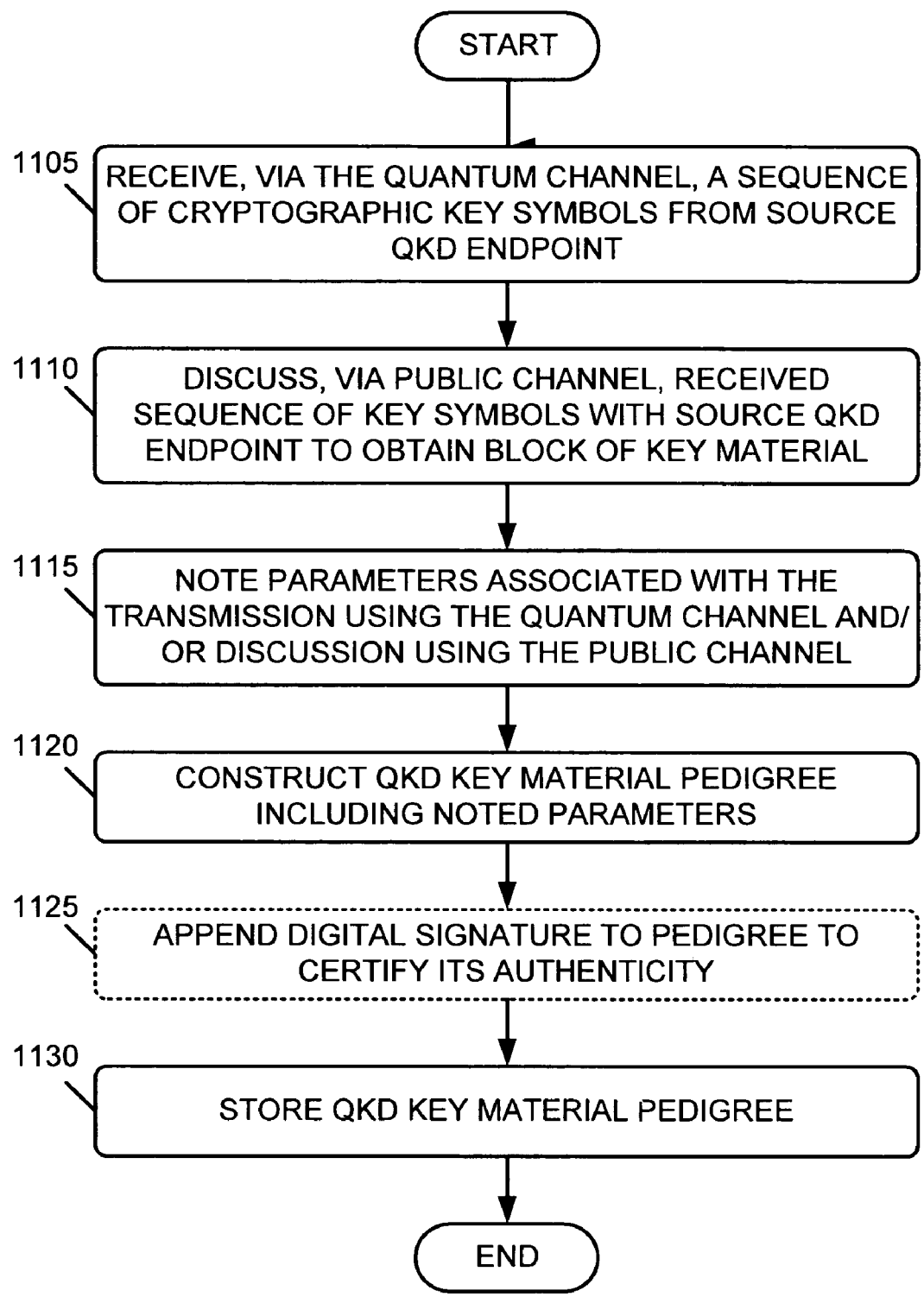
FIG. 11 is a flow chart that illustrates an exemplary quantum cryptographic key reception process consistent with principles of the invention.

FIG. 11 is a flowchart that illustrates an exemplary process, consistent with principles of the invention, for receiving encryption key material from another QKD endpoint using quantum cryptographic mechanisms and constructing a key pedigree based on the received key material. As one skilled in the art will appreciate, the method exemplified by FIG. 11 can be implemented as a sequence of instructions and stored in memory 510 of a QKD endpoint 410 for execution by processing unit 505.

The exemplary process may begin with the reception, via the quantum channel, of a sequence of cryptographic key symbols from a source QKD endpoint (block 1105). For example, QKD endpoint 410b may receive a sequence of cryptographic key symbols from QKD endpoint 410a via quantum cryptography over the quantum channel. The sequence of cryptographic key symbols may be encoded, for example, in received photons by modulation of the phase, polarization and/or energy of the photons. The received sequence of key symbols may be discussed, via the public channel, with the source QKD endpoint to obtain a block of key material (block 1110). For example, receiving QKD endpoint 410b may discuss, via the public channel, the sequence of key symbols transmitted from QKD endpoint 410a. The public discussion may use "sifting" techniques of sifting layer 740 for obtaining a block of key material that includes a subset of the transmitted sequence of cryptographic key symbols.

Parameters associated with the transmission using the quantum channel and/or discussion using the public channel may be noted (block 1115). The parameters may include any of those described above with respect to block 820 of FIG. 8. Other parameters than those described above, however, may be noted and used in a key pedigree consistent with principles of the invention.

A QKD key material pedigree may be constructed that includes the noted parameters (block 1120). The key pedigree may include relevant details of how and when the associated block of key material was produced. The key pedigree may include any, some, or all of, the parameters described above with respect to the exemplary pedigrees of FIGS. 9 and 10. The key pedigree may further include ancilliary information derived from classical cryptography, such as an indication of the mathematical function employed to produce the block of key material, the derived classical session key, etc.

A digital signature may be appended to the pedigree to certify its authenticity (optional block 1125). The digital signature may certify the authenticity of the pedigree and may be produced using any type of existing authentication technique. The QKD key material pedigree may be stored (block 1130). If the receiving QKD endpoint (e.g., endpoint 410*b*) receives key symbols from the transmitting QKD endpoint (e.g., endpoint 410*a*) and is connected to key pedigree database 430, then the receiving QKD endpoint may store the pedigree in key pedigree database 430. Alternatively, if the receiving QKD endpoint is not connected to key pedigree database 430, the receiving QKD endpoint may communicate the pedigree to pedigree collector 420 which, in turn, may store the pedigree in key pedigree database 430.

Exemplary Key Pedigree Usage Process

Figure 12:
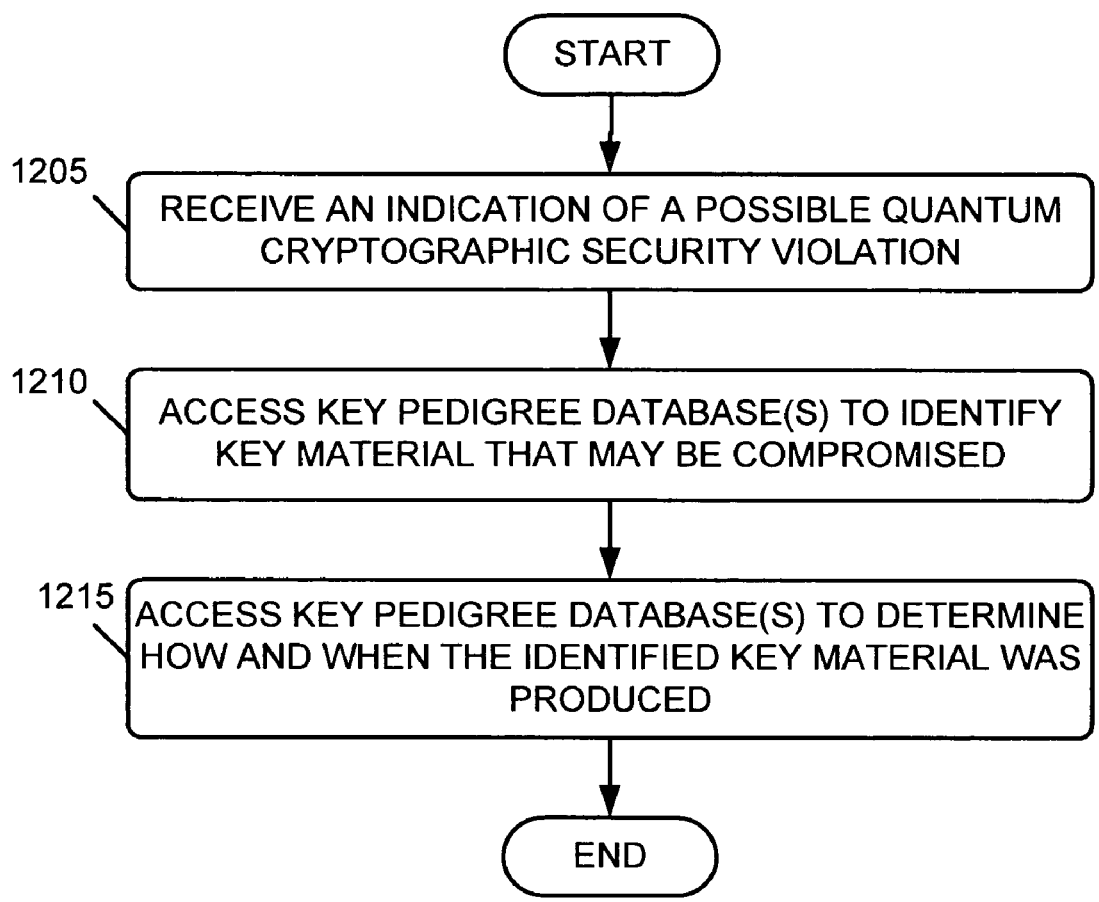
FIG. 12 is a flow chart that illustrates an exemplary process for determining how and when key material associated with a possible quantum cryptographic security violation was produced.

FIG. 12 is a flowchart that illustrates an exemplary process, consistent with principles of the invention, for using key pedigrees stored in a key pedigree database(s) to determine how and when key material associated with a possible quantum cryptographic security violation was produced. As one skilled in the art will appreciate, the method exemplified by FIG. 12 can be implemented as a sequence of instructions by a processing unit of a QKD endpoint 410, pedigree collector 420, or by any other suitable entities, such as a post-facto security fault tracing system, auditing system, etc.

The exemplary process may begin with the receipt of a possible quantum cryptographic security violation (block 1205). For example, it may be discovered that an undetected eavesdropper was indeed present during quantum cryptographic key distribution over some period of time. As another example, it may be discovered that a certain photon emission rate (e.g., 0.5 mean photons per photon pulse) of the transmitting QKD endpoint 410 was insecure, despite the fact that it was thought to be secure at the time it was used. As a further example, a given QKD endpoint may have obtained key material from one of a number of different QKD endpoints. Later, it may be suspected that this key material may be known to some adversary and, thus, may be compromised.

The key pedigree database(s) 430 may be accessed to identify key material that may be compromised (block 1210). Relevant parameters regarding the possible security violation (e.g., an identification of the producing QKD endpoint involved in a specific QKD key distribution, a specific period of public discussion, a specific period during which QKD key distribution occurred, etc.) may be used to access key pedigrees 900 in key pedigree database 450 to identify specific key pedigrees the content of which match the relevant parameters. Key material 905 from the identified key pedigrees may be retrieved to ascertain the specific key material that may have been compromised.

The key pedigree database(s) 430 may further be accessed to determine how and when the identified key material was produced (block 1220). Other parameters associated with identified specific key pedigrees, the content of which match the relevant parameters associated with the security violation, may be obtained from the key pedigrees. For example, if a producing QKD endpoint is known to be associated with a possible security violation, then all QKD endpoints that have been involved with QKD with that QKD endpoint may be retrieved from corresponding key pedigrees in the key pedigree database(s) 430.

Conclusion

The foregoing description of exemplary embodiments of the present invention provides illustration and description, but is not intended to be exhaustive or to limit the invention to the precise form disclosed. Modifications and variations are possible in light of the above teachings or may be acquired from practice of the invention. For example, while certain components of the invention have been described as implemented in software and others in hardware, other configurations may be possible. As another example, while some embodiments of the present invention have been described as using optical QKD pulses (i.e., photon pulses) for encoding and transmitting cryptographic keys, it will be appreciated that other non-optical pulses that include, for example, individual atoms, electrons, etc., may alternatively be used. In embodiments employing non-optical pulses, the individual quantum particles (e.g., atoms, electrons) may be modulated to encode cryptographic key symbols.

While a series of acts has been described with regard to FIGS. 8, 11 and 12, the order of the acts may vary in other implementations consistent with the present invention. Also, non-dependent acts may be performed in parallel. No element, act, or instruction used in the description of the present application should be construed as critical or essential to the invention unless explicitly described as such. Also, as used herein, the article "a" is intended to include one or more items. Where only one item is intended, the term "one" or similar language is used. The scope of the invention is defined by the following claims and their equivalents.

What is claimed is:

1. A method, comprising:
communicating a sequence of symbols using quantum cryptographic mechanisms between two nodes to derive a block of encryption key material;
constructing a pedigree that includes details related to a manner in which the block of encryption key material was produced using the quantum cryptographic mechanisms and a time when the block of encryption key material was produced using the quantum cryptographic mechanisms, the details including:
information identifying a first time at which a public exchange of the communicated sequence of symbols was initiated, and information identifying a second time at which the public exchange of the communicated sequence of symbols was completed, and
at least one of:
identification information associated with at least one endpoint that produced or received the block of encryption key material, or
a unique identifier associated with the sequence of symbols communicated using the quantum cryptographic mechanisms;
storing the constructed pedigree; and
using the stored pedigree to investigate a quantum cryptographic key distribution security violation,
where using the stored pedigree to investigate the quantum cryptographic key distribution security violation includes:
retrieving the stored pedigree based on an indication of the quantum cryptographic key distribution security violation; and
using the retrieved pedigree to identify, based on the indication of the quantum cryptographic key distribution security violation, one or more blocks of encryption key material that have been compromised.

2. The method of claim 1, where the constructed pedigree further includes information related to classical cryptography.

3. The method of claim 1, further comprising:
publicly exchanging the communicated sequence of symbols between the two nodes to derive the block of encryption key material from the sequence of symbols.

4. The method of claim 1, further comprising:
using the block of encryption key material for encrypting traffic sent between the two nodes via a public channel.

5. The method of claim 1, where storing the constructed pedigree comprises:
transmitting the constructed pedigree across a network to cause the constructed pedigree to be stored in a remote location.

6. The method of claim 1, further comprising:
appending a digital signature to the constructed pedigree to certify its authenticity.

7. The method of claim 1, where the details, related to the manner in which the block of encryption key material was produced and the time when the block of encryption key material was produced, further include at least one of:
whether an underlying optical system used for symbol communication using quantum cryptographic mechanisms is based on an attenuated laser pulse, a true single photon source, or pairs of entangled photons;
a mean photon number if an underlying optical system used for symbol communication using quantum cryptographic mechanisms comprises an attenuated laser;
error bounds that an error detection and correction protocol associated with the symbol communication using quantum cryptographic mechanisms is designed to achieve;
times at which the block of encryption key material was derived, including the starting and ending times for communicating the sequence of symbols using quantum cryptographic mechanisms;
an amount of privacy amplification used for deriving the block of encryption key material;
identification information of the two nodes that participated in communicating the sequence of symbols using the quantum cryptographic mechanisms;
an observed error rate associated with the communication of the sequence of symbols;
an estimated entropy rate for the derived block of encryption key material;
times at which quantum key distribution (QKD) protocols that derived the block of encryption key material operated;
identification information of one or more of quantum key distribution (QKD) protocols used to derive the block of encryption key material;
a size of the block of encryption key material;
parameters of a security guarantee associated with the block of encryption key material; or
one or more random numbers used in deriving the block of encryption key material.

8. A system, comprising:
a quantum cryptographic transmitter to transmit a sequence of symbols using quantum cryptographic mechanisms to a node;
a network interface to publicly exchange the transmitted sequence of symbols with the node to derive a plurality of blocks of encryption key material from the transmitted sequence of symbols; and
a processing unit to:
construct a quantum cryptography key pedigree that includes details related to a manner in which the plurality of blocks of encryption key material was produced using the quantum cryptographic mechanisms and a time when the plurality of blocks of encryption key material was produced using the quantum cryptographic mechanisms,
where the constructed quantum cryptography key pedigree includes at least one of:
information identifying a first time at which the public exchange of the transmitted sequence of symbols was initiated, and information identifying a second time at which the public exchange of the transmitted sequence of symbols was completed, and
at least one of:
identification information associated with at least one endpoint that produced or received one or more of the plurality of blocks of encryption key material, or
information uniquely identifying the transmitted sequence of symbols,
store the constructed quantum cryptography key pedigree, and
use the stored quantum cryptography key pedigree to identify at least one of the plurality of blocks of encryption key material that has been compromised,
where, when using the constructed quantum cryptography key pedigree to identify the at least one of the plurality of blocks of encryption key material that has been compromised, the processing unit is to:
retrieve the stored quantum cryptography key pedigree based on an indication of a security violation, and
use the retrieved quantum cryptography key pedigree to identify, based on the indication of the security violation, the at least one of the plurality of blocks of encryption key material that has been compromised.

9. The system of claim 8, where the details further include:
identification information of a first endpoint and a second endpoint associated with transmission of the sequence of symbols, and
an estimated entropy rate for at least one of the plurality of blocks of encryption key material.

10. A method, comprising:
communicating symbols using quantum cryptographic mechanisms between a first endpoint and a second endpoint;
publicly exchanging the symbols between the first endpoint and the second endpoint to obtain a block of encryption key material;
identifying parameters associated with at least one of the symbols communicated using the quantum cryptographic mechanisms or the public exchange of the symbols,
where the identified parameters, associated with at least one of the symbols communicated using the quantum cryptographic mechanisms or the public exchange, comprise:
information identifying a first time when the public exchange of the symbols was initiated and information identifying a second time when the public exchange of the symbols was completed, and
at least one of:
a mean photon number when an underlying optical system, used for symbol communication using the quantum cryptographic mechanisms, comprises an attenuated laser, or
information identifying times when quantum key distribution protocols, that were used to obtain the block of encryption key material, operated;

storing the identified parameters as a pedigree for the block of encryption key material;

retrieving the stored pedigree based on an indication of a quantum cryptographic key distribution security violation; and using the retrieved pedigree to identify, based on the indication of the security violation, one or more blocks of encryption key material that have been compromised.

11. The method of claim 10, where the identified parameters further include information related to classical cryptography.

12. The method of claim 10, where the identified parameters indicate a manner in which and a time when the block of encryption key material was produced using the quantum cryptographic mechanisms.

13. The method of claim 10, where the identified parameters further comprise at least one of:

whether an underlying optical system used for symbol communication using quantum cryptographic mechanisms is based on an attenuated laser pulse, a true single photon source, or pairs of entangled photons;

error bounds that an error detection and correction protocol associated with the symbol communication using the quantum cryptographic mechanisms is designed to achieve;

an amount of privacy amplification used for obtaining the block of encryption key material;

identification information of at least one of the first endpoint or the second endpoint that participated in the symbol communication using quantum cryptographic mechanisms;

a unique identifier for the symbols communicated using the quantum cryptographic mechanisms;

times at which the block of encryption key material was obtained, including starting and ending times for communicating the symbols using the quantum cryptographic mechanisms;

an observed error rate associated with the communication of the symbols;

an estimated entropy rate for the obtained block of encryption key material;

identification information of one or more quantum key distribution (QKD) protocols used to obtain the block of encryption key material; or information related to authentication used in publicly exchanging the communicated symbols.

14. A system, comprising:

a quantum cryptographic receiver to receive symbols transmitted from a node using quantum cryptographic mechanisms;

a network interface to publicly exchange the received symbols with the node to obtain a block of encryption key material; and a processing unit to:

identify parameters associated with at least one of the transmission of the symbols or the public exchange of the received symbols, the identified parameters including:

information identifying a period of time during which the received symbols were publicly exchanged, and at least one of:

identification information of one or more quantum key distribution protocols used to obtain the block of encryption key material, or identification information that uniquely identifies the block of encryption key material, store the identified parameters as a pedigree for the block of encryption key material, retrieve the stored pedigree based on an indication of at least one security violation associated with one or more blocks of encryption key material, and use the retrieved pedigree to identify, based on the indication of the at least one security violation, the one or more blocks of encryption key material that have been compromised.

15. A method, comprising:

storing pedigrees that include details related to a manner in which at least one of a plurality of blocks of encryption key material was distributed between two endpoints using quantum cryptographic techniques and a time when the at least one of the plurality of blocks of encryption key material was distributed between the two endpoints using the quantum cryptographic techniques;

receiving an indication of a quantum cryptographic security violation, the received indication of the quantum cryptographic security violation including;

identification information of a producing quantum key distribution endpoint associated with the received indication of the quantum cryptographic security violation, and at least one of:

a first period of time during which a quantum key distribution, associated with the quantum cryptographic security violation, occurred, the first period of time including a first starting time and a first ending time, or a second period of time during which a public exchange of symbols, associated with the quantum cryptographic security violation, occurred, the second period of time including a second starting time and a second ending time;

accessing, in response to receiving the indication of the quantum cryptographic security violation, the stored pedigrees to identify, based on the received indication of the quantum cryptographic security violation, a first pedigree, of the stored pedigrees, associated with one or more of the plurality of blocks of encryption key material that have been compromised;

identifying, based on the identification information of the producing quantum key distribution endpoint, a second pedigree of the stored pedigrees;

retrieving identification information of another quantum key distribution endpoint, associated with the producing quantum key distribution endpoint, from the identified second pedigree; and using the identified first pedigree and the identification information of the other quantum key distribution endpoint to ascertain at least one of an extent or a nature of the quantum cryptographic key security violation.

16. The method of claim 15, further comprising:

determining, based on the identified first pedigree, a manner in which the one or more of the plurality of blocks of encryption key material were distributed and a time when the one or more of the plurality of blocks of encryption key material were distributed.

17. The method of claim 15, where accessing the stored pedigrees comprises:

using the stored pedigrees to identify encryption material that has been compromised by an eavesdropper.

18. A method, comprising:

storing pedigrees that include details related to a manner in which at least one of a plurality of blocks of encryption key material were produced using quantum cryptographic techniques and a time when the at least one of the plurality of blocks of encryption key material were produced using the quantum cryptographic techniques;

receiving an indication of a quantum cryptographic key distribution security violation, where the received indication of quantum cryptographic key distribution security violation includes one or more parameters, the one or more parameters including:
identification information of a producing quantum key distribution endpoint associated with the received indication of the quantum cryptographic key distribution security violation, and
a period of time during which a quantum key distribution, associated with the received indication of a quantum cryptographic key distribution security violation, occurred;

identifying at least one of the stored pedigrees based on the one or more parameters;

identifying one or more of the stored pedigrees based on the identification information of the producing quantum key distribution endpoint;

retrieving, from the identified one or more of the stored pedigrees, identification information of one or more other quantum key distribution endpoints that are associated with the producing quantum key distribution endpoint and using the identified at least one of the stored pedigrees and the identification information of the one or more other quantum key distribution endpoints to ascertain at least one of an extent or a nature of the quantum cryptographic key distribution security violation.

19. The method of claim of claim 18, where the details include:
parameters of a security guarantee associated with one or more of the plurality of blocks of encryption key material, and an estimated entropy rate for the one or more of the plurality of blocks of encryption key material.

20. A system, comprising:
a database to store pedigrees that include details related to a manner in which one or more of a plurality of blocks of encryption key material were produced using quantum cryptographic techniques and a time when the one or more of the plurality of blocks of encryption key material were produced using the quantum cryptographic techniques,
where the details include at least one of:
an amount of privacy amplification used for obtaining the one or more of the plurality of blocks of encryption key material,
whether an underlying optical system used for symbol communication using the quantum cryptographic mechanisms is based on an attenuated laser pulse, a true single photon source, or pairs of entangled photons, or
a mean photon number when an underlying optical system, used for symbol communication using quantum cryptographic mechanisms, comprises an attenuated laser; and
a processing unit to:
receive an indication of a quantum cryptographic security violation, the received indication of the quantum cryptographic security violation including information identifying a producing quantum key distribution endpoint associated with the received indication of the quantum cryptographic security violation,
access the stored pedigrees to identify, based on the quantum cryptographic security violation, a first pedigree, of the stored pedigrees; corresponding to one or more encryption keys that have been compromised,
identify, based on the information identifying the producing quantum key distribution endpoint, a second pedigree of the stored pedigrees;
retrieve, from the identified second pedigree, information identifying another quantum key distribution endpoint that is associated with the producing quantum key distribution endpoint; and
use the identified first pedigree and the information identifying the other quantum key distribution endpoint to investigate the quantum cryptographic security violation.

21. A non-transitory computer-readable recording medium that stores instructions executable by a processing unit, the computer-readable recording medium comprising:
instructions for transmitting symbols using quantum cryptographic mechanisms via a quantum channel to a node;
instructions for exchanging the transmitted symbols with the node, via a public channel, to derive a block of encryption key material;
instructions for constructing a pedigree that includes details related to a manner in which the block of encryption key material was produced using quantum cryptographic techniques and a time when the block of encryption key material was produced using the quantum cryptographic techniques,
where the details, related to the manner in which the block of encryption key material was produced and the time when the block of encryption key material was produced, include:
information identifying a first time at which the exchanging the transmitted symbols was initiated, and information identifying a second time at which the exchanging the transmitted symbols was completed, and
at least one:
information identifying times at which quantum key distribution mechanisms that derived the block of encryption key material operated, or
identification information associated with the block of encryption key material;
instructions for retrieving the constructed pedigree based on an indication of a quantum cryptographic key distribution security violation; and
instructions for using the retrieved pedigree, when investigating the quantum cryptographic key distribution security violation, to identify one or more blocks of encryption key material that have been compromised.

22. The non-transitory computer-readable recording medium of claim 21, further comprising:
instructions for identifying another pedigree based on identification information of a quantum key distribution endpoint, where the quantum key distribution endpoint is associated with another quantum cryptographic key distribution security violation;
instructions for retrieving, from the other pedigree, identification information of one or more other quantum key distribution endpoints that are associated with the quantum key distribution endpoint; and
instructions for investigation the other quantum cryptographic key distribution security violation based on the identification information of the one or more other quantum key distribution endpoints.

23. A system, comprising:
means for storing pedigrees that include details related to a manner in which at least one of a plurality of blocks of encryption key material were produced using quantum cryptographic techniques and a time when the at least one of the plurality of blocks of encryption key material were produced using the quantum cryptographic techniques, where the details include:
  starting and ending times at which the plurality of blocks of encryption key material was obtained;

means for receiving an indication of a quantum cryptographic key distribution security violation, where the received indication of the quantum cryptographic key distribution security violation includes:
  information identifying a producing quantum key distribution endpoint associated with the received indication of the quantum cryptographic key distribution security violation, and
  a period of time during which a quantum key distribution, associated with the received indication of a the quantum cryptographic key distribution security violation, occurred;

means for identifying, based on the received indication of the quantum cryptographic key distribution security violation, a first pedigree of the stored pedigrees;

means for identifying, based on the information identifying the producing quantum key distribution endpoint, a second pedigree of the stored pedigrees;

means for retrieving, from the identified second pedigree, information identifying another quantum key distribution endpoint that is associated with the producing quantum key distribution endpoint; and means for using the first pedigree and the information identifying the other quantum key distribution endpoint to ascertain at least one of an extent or a nature of the quantum cryptographic key distribution security violation.

* * * * *

UNITED STATES PATENT AND TRADEMARK OFFICE
CERTIFICATE OF CORRECTION

| | | |
|---|---|---|
| PATENT NO. | : 8,082,443 B2 | Page 1 of 1 |
| APPLICATION NO. | : 11/327471 | |
| DATED | : December 20, 2011 | |
| INVENTOR(S) | : Gregory Troxel et al. | |

It is certified that error appears in the above-identified patent and that said Letters Patent is hereby corrected as shown below:

Claim 15 (Column 18, line 20) after "including" delete ";" and insert --:--.

Claim 18 (Column 19, line 26) after "point" insert --;--.

Claim 20 (Column 20, line 1) after "pedigrees" delete the ";" and insert --,--.

Claim 23 (Column 21, line 17) after "indication of" delete "a".

Signed and Sealed this
Twenty-fourth Day of April, 2012

David J. Kappos
*Director of the United States Patent and Trademark Office*